United States Patent
Park et al.

(10) Patent No.: US 10,732,466 B2
(45) Date of Patent: Aug. 4, 2020

(54) LIQUID-CRYSTAL DISPLAY DEVICE

(71) Applicant: Samsung Display Co., Ltd., Yongin-si (KR)

(72) Inventors: Heung Shik Park, Seoul (KR); Ho Kil Oh, Seoul (KR); Jae Soo Jang, Suwon-si (KR); Ki Chul Shin, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/831,278

(22) Filed: Dec. 4, 2017

(65) Prior Publication Data
US 2019/0049761 A1 Feb. 14, 2019

(30) Foreign Application Priority Data
Aug. 8, 2017 (KR) .................. 10-2017-0100401

(51) Int. Cl.
G02F 1/1343 (2006.01)
G02F 1/13357 (2006.01)
G02F 1/1362 (2006.01)
G02F 1/1335 (2006.01)

(52) U.S. Cl.
CPC ...... *G02F 1/134309* (2013.01); *G02F 1/1336* (2013.01); *G02F 1/133504* (2013.01); *G02F 1/133514* (2013.01); *G02F 1/133617* (2013.01); *G02F 1/136286* (2013.01); G02F 2001/133614 (2013.01); G02F 2001/134345 (2013.01); G02F 2201/123 (2013.01); G02F 2202/36 (2013.01)

(58) Field of Classification Search
CPC ............ G02F 1/134309; G02F 1/1343; G02F 2201/123; G02F 1/136286; G02F 1/133707; G09G 2300/0426
See application file for complete search history.

(56) References Cited

U.S. PATENT DOCUMENTS

| 9,778,518 | B2 | 10/2017 | Woo et al. | |
| 2003/0043336 | A1* | 3/2003 | Sasaki ............... | G02F 1/133788 349/187 |
| 2005/0162601 | A1* | 7/2005 | Matsuoka ......... | G02F 1/134363 349/141 |

(Continued)

FOREIGN PATENT DOCUMENTS

| KR | 10-1296621 | 8/2013 |
| KR | 10-2016-0090967 | 9/2016 |
| KR | 10-2016-0103244 | 9/2016 |

*Primary Examiner* — Jia X Pan
(74) *Attorney, Agent, or Firm* — H.C. Park & Associates, PLC

(57) ABSTRACT

A liquid-crystal display device includes: a first substrate comprising a plurality of pixels; a pixel electrode disposed on the first substrate in each of the pixels; a second substrate including a surface facing the first substrate; a wavelength conversion layer and a transmissive layer disposed on the surface of the second substrate facing the first substrate; and a liquid-crystal layer disposed between the pixel electrode and the wavelength conversion layer and between the pixel electrode and the transmissive layer, wherein the pixel electrode includes a stem electrode and a plurality of branch electrodes extending from the stem electrode, and wherein all of the plurality of branch electrodes extending from the stem electrode extend in a same direction.

13 Claims, 18 Drawing Sheets

(56) References Cited

U.S. PATENT DOCUMENTS

| | | | | |
|---|---|---|---|---|
| 2007/0229748 A1* | 10/2007 | Fujita | ............... | G02F 1/133707 |
| | | | | 349/141 |
| 2009/0284673 A1* | 11/2009 | Kim | ................ | G02F 1/134309 |
| | | | | 349/33 |
| 2010/0157232 A1* | 6/2010 | Kim | ..................... | G02F 1/1393 |
| | | | | 349/144 |
| 2012/0075562 A1* | 3/2012 | Yeh | ..................... | G02F 1/1323 |
| | | | | 349/139 |
| 2013/0057813 A1* | 3/2013 | Jeong | ............... | G02F 1/134309 |
| | | | | 349/110 |
| 2013/0242228 A1* | 9/2013 | Park | ................. | G02F 1/133617 |
| | | | | 349/61 |
| 2014/0354931 A1* | 12/2014 | Kurasawa | ........ | G02F 1/134336 |
| | | | | 349/124 |
| 2016/0195773 A1 | 7/2016 | Lee et al. | | |
| 2016/0216557 A1 | 7/2016 | Rho et al. | | |
| 2017/0235195 A1* | 8/2017 | Song | ................ | G02F 1/134309 |
| | | | | 349/43 |
| 2017/0315411 A1* | 11/2017 | Shin | ................. | G02F 1/136286 |
| 2017/0322462 A1* | 11/2017 | Lee | ..................... | G02F 1/13394 |
| 2018/0164622 A1* | 6/2018 | Ono | ..................... | G02F 1/1395 |

\* cited by examiner

LIQUID-CRYSTAL DISPLAY DEVICE

CROSS-REFERENCE TO RELATED APPLICATION

This application claims priority from and the benefit of Korean Patent Application No. 10-2017-0100401, filed on Aug. 8, 2017, which is hereby incorporated by reference for all purposes as if fully set forth herein.

BACKGROUND

Field

Exemplary embodiments relate to a liquid-crystal display (LCD) device. More particularly, exemplary embodiments relate to an LCD device including a wavelength conversion layer.

Discussion of the Background

Display devices become more and more important as multimedia technology evolves. Accordingly, a variety of types of display devices such as liquid-crystal display (LCD) devices and organic light-emitting display (OLED) devices are currently used.

Among display devices, an LCD device is one of the most broadly used flat panel display devices. An LCD device includes electric field generating electrodes such as pixel electrodes and common electrodes, and a liquid-crystal layer. An LCD device displays an image in such a manner that voltage is applied to field generating electrodes to generate electric field across a liquid-crystal layer, and liquid-crystal molecules in the liquid-crystal layer are aligned by the electric field so as to control the polarization of incident light.

Among such LCD devices, a vertically-aligned (VA) mode LCD, in which liquid-crystal molecules are oriented such that their major axes are perpendicular to the top and bottom plates when no electric field is applied, is attracting attention since it has large contrast ratio and is easy to achieve wide viewing angle.

The above information disclosed in this Background section is only for enhancement of understanding of the background of the inventive concept, and, therefore, it may contain information that does not form the prior art that is already known in this country to a person of ordinary skill in the art.

SUMMARY

An LCD device using a phosphor that emits light of a specific wavelength band upon receiving light or a fluorescent substance in order to realize color has been proposed. Display devices using a phosphor or a fluorescent substance have a wider viewing angle. Therefore, there is greater freedom of design for increasing the transmittance of display devices, thus allowing designs which may achieve greater transmittance.

Exemplary embodiments provide an LCD device with improved transmittance.

Additional aspects will be set forth in the detailed description which follows, and, in part, will be apparent from the disclosure, or may be learned by practice of the inventive concept.

According to exemplary embodiments, a liquid-crystal display (LCD) device includes: a first substrate comprising a plurality of pixels; a pixel electrode disposed on the first substrate in each of the plurality of pixels; a second substrate including a surface facing the first substrate; a wavelength conversion layer and a transmissive layer disposed on the surface of the second substrate facing the first substrate; and a liquid-crystal layer disposed between the pixel electrode and the wavelength conversion layer and between the pixel electrode and the transmissive layer, wherein the pixel electrode includes a stem electrode and a plurality of branch electrodes extending from the stem electrode, and wherein all of the plurality of branch electrodes extending from the stem electrode extend in a same direction.

According to exemplary embodiments, a liquid-crystal display (LCD) device includes a first substrate comprising a plurality of pixels, a pixel electrode disposed on the first substrate in each of the plurality of pixels, a second substrate including a surface facing the first substrate, a wavelength conversion layer and a transmissive layer disposed on the surface of the second substrate facing the first substrate, and a liquid-crystal layer disposed between the pixel electrode and the wavelength conversion layer and between the pixel electrode and the transmissive layer. The pixel electrode comprises a stem electrode and a plurality of branch electrodes extending from the stem electrode. Some of the plurality of branch electrodes extending from the stem electrode extends in a first direction while some of the plurality of branch electrodes extends in a second direction.

According to another exemplary embodiment, a liquid-crystal display (LCD) device includes: a backlight unit configured to provide light; a first substrate disposed above the backlight unit, wherein a plurality of pixels is defined on the first substrate; a pixel electrode disposed on the first substrate in each of the pixels; a second substrate including a surface facing the first substrate; a wavelength conversion layer and a transmissive layer disposed on the surface of the second substrate facing the first substrate; and a liquid-crystal layer disposed between the pixel electrode and the wavelength conversion layer and between the pixel electrode and the transmissive layer, wherein the pixel electrode includes a stem electrode and a plurality of branch electrodes extending from the stem electrode, and wherein at least some of the branch electrodes extending from the stem electrode extend in a same direction.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
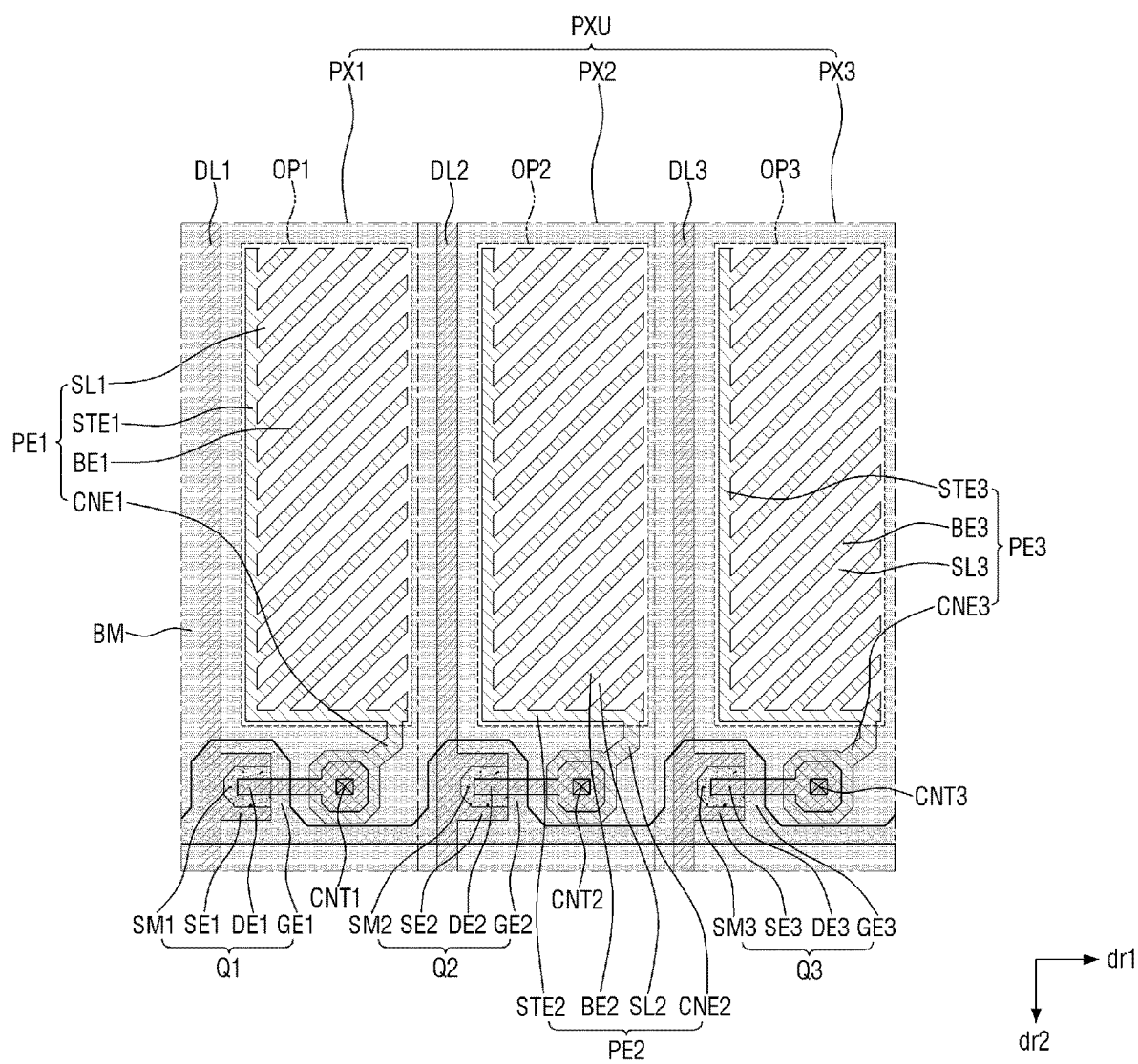
FIG. 1 is a layout diagram showing a pixel unit according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

In the present invention, an electronic apparatus may be any apparatus provided with a display device. Examples of the electronic apparatus may include smart phones, mobile phones, navigators, game machines, TVs, car head units, notebook computers, laptop computers, tablet computers, personal media players (PMPs), and personal digital assistants (PDAs). The electronic apparatus may be embodied as a pocket-sized portable communication terminal having a wireless communication function. Further, the display device may be a flexible display device capable of changing its shape.

Hereinafter, exemplary embodiments will be described with reference to the attached drawings.

Figure 2:
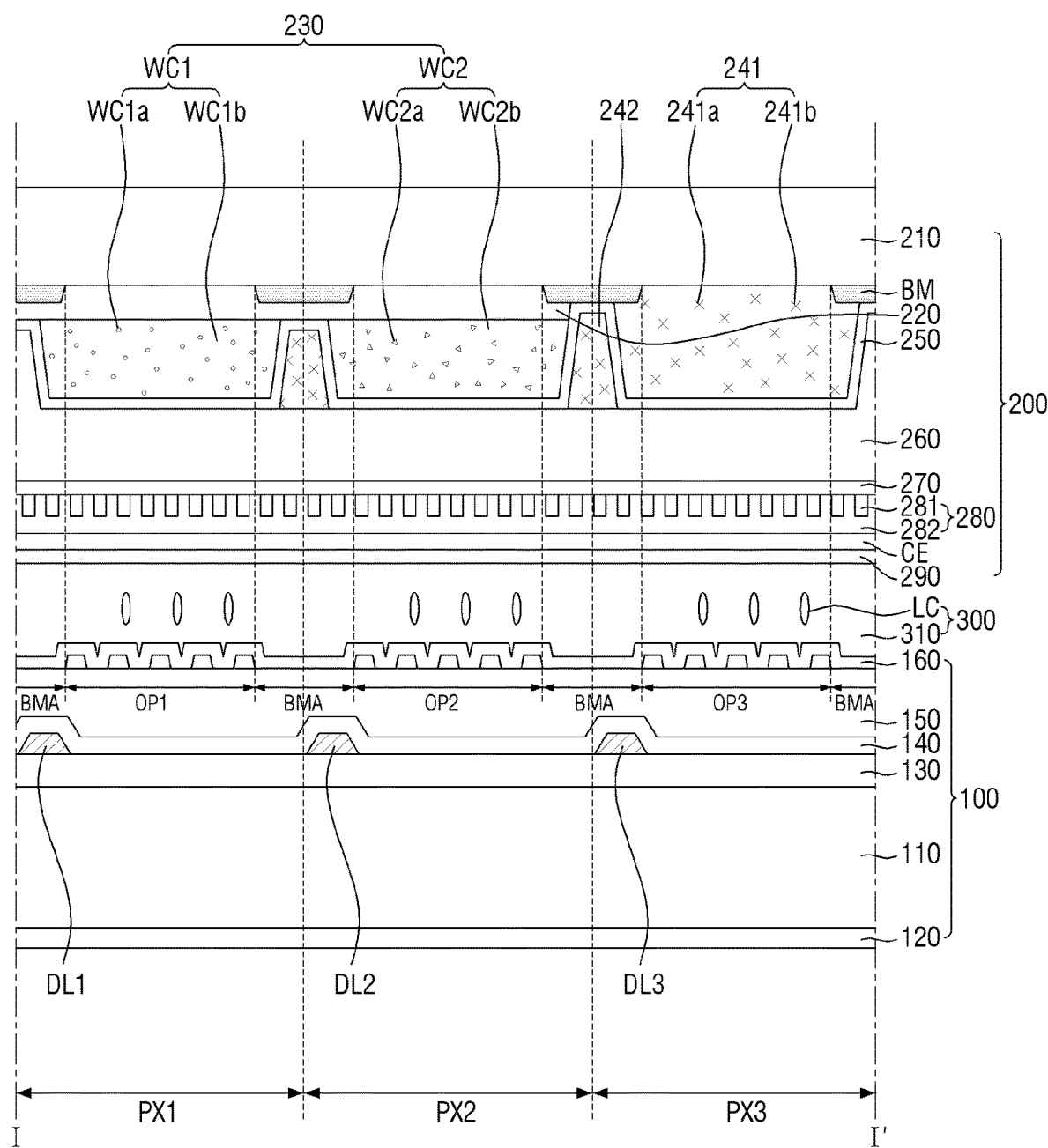
FIG. 2 is a cross-sectional view taken along line I-I' of FIG. 1.

FIG. 1 is a layout diagram showing a pixel unit according to an exemplary embodiment. FIG. 2 is a cross-sectional view taken along line I-I' of FIG. 1.

Referring to FIGS. 1 and 2, a display device according to an exemplary embodiment includes a bottom plate 100, a top plate 200, and a liquid-crystal layer 300.

Spatially relative terms such as "upper" and "lower" may be used herein as illustrated in FIG. 2. As used herein, the phase "an element is disposed on the lower substrate 110" means that the element is disposed on the surface of the lower substrate 110 closer to an upper substrate 210, while the phase "an element is disposed under the lower substrate 110" means that the element is disposed on the opposite surface of the lower substrate 110. In addition, as used herein, the phase "an element is disposed on the upper substrate 210" means that the element is disposed on the surface of the upper substrate 210 closer to an upper substrate, while the phase "an element is disposed under the upper substrate 210" means that the element is disposed on the opposite surface of the upper substrate 210.

The bottom plate 100 and the top plate 200 may face each other. The liquid-crystal layer 300 may be interposed between the bottom plate 100 and the top plate 200, and may include a number of liquid-crystal molecules LC. In an exemplary embodiment, the bottom plate 100 and the top plate 200 may be attached together by a sealing process.

The LCD device may include a plurality of pixel units PXU arranged in a matrix. The plurality of pixel units PXU may be disposed on the lower substrate 110. Each of the pixel units PXU may include a first pixel PX1, a second pixel PX2 and a third pixel PX3. In an exemplary embodiment, the first pixel PX1, the second pixel PX2 and the third pixel PX3 may display different colors. The grayscale of each of the first pixel PX1, the second pixel PX2 and the third pixel PX3 may be controlled individually, and each of them may be a unit for reproducing a particular color. The pixel unit PXU may control the transmittance of each of the first pixel PX1, the second pixel PX2, and the third pixel PX3, and may combine the colors from them to produce a desired color. Although the pixel units PXU are arranged in parallel in the first direction dr1 in the exemplary embodiment, they may be arranged adjacent to one another in a different way. Although the pixel unit PXU includes first pixel PX1, the second pixel PX2, and the third pixel PX3 in the embodiment, the number of the pixels is not limited to three.

Hereinafter, the bottom plate 100 will be described.

In an exemplary embodiment, the lower substrate 110 may be a transparent insulation substrate. The transparent insulation substrate may include a glass substrate, a quartz substrate, a transparent resin substrate, etc.

A first polarizing layer 120 may be disposed under the lower substrate 110. More specifically, the lower substrate 110 may have a surface facing the upper substrate 210 and the other surface opposed to the surface. The first polarizing layer 120 may be disposed on the other surface of the lower substrate 110. The first polarizing layer 120 may be made of an organic material or an inorganic material. The first polarizing layer 120 may be a reflective polarizing layer. When the first polarizing layer 120 is a reflective polarizing layer, it may transmit polarization components in parallel with the transmission axis while reflecting polarization components in parallel with the reflection axis.

In another exemplary embodiment, the first polarizing layer 120 may be disposed on the lower substrate 110. That is, the first polarizing layer 120 may be disposed between the lower substrate 110 and a first insulating layer 130 to be described below.

On the lower substrate 110, a first gate line GL1 and first to third gate electrodes GE1 to GE3 may be disposed.

The first gate line GL1 may deliver a gate voltage for controlling a thin-film transistor. The first gate line GL1 may have a shape extending in a first direction dr1.

Herein, the first direction dr1 may be indicated by a straight line extending in an arbitrary direction on a plane on which the lower substrate 110 is disposed. The first direction dr1 may be perpendicular to a second direction dr2 described later.

The gate voltage may be applied from an external source and may have a varying voltage level. The thin-film transistor may be turned on and off in response to the voltage level of the gate voltage.

The first to third gate electrodes GE1 to GE3 may protrude from the first gate line GL1 and may be physically connected to the first gate line GL1. The first to third gate electrodes GE1 to GE3 may be one element of the first to third thin-film transistors Q1 to Q3, respectively which are described later.

The first gate line GL1 and the first to third gate electrodes GE1 to GE3 may be made of the same material. For example, the first gate line GL1 and the first to third gate electrodes GE1 to GE3 may include: an aluminum-based metal such as aluminum (Al) and an aluminum alloy; a silver-based metal such as silver (Ag) and a silver alloy; a gold-based metal such as copper (Cu) and a copper alloy; a molybdenum-based metal such as molybdenum (Mo) and a molybdenum alloy; chrome (Cr); tantalum (Ta); and titanium (Ti). The gate line GL1 and the first to third gate electrodes GE1 to GE3 may have a single layer structure. Alternatively, the gate line GL1 and the first to third gate electrodes GE1 to GE3 may have a multi-layer structure including at least two conductive layer having different physical properties.

A first insulating layer 130 may be disposed on the first gate line GL1 and the first to third gate electrodes GE1 to GE3. The first insulating layer 130 may be made of an insulative material, for example, silicon nitride or silicon oxide. The first insulating layer 130 may have a single layer structure or may have multi-layer structure including two insulating layer having different physical properties.

The first to third semiconductor layers SM1 to SM3 may be disposed on the first insulating layer 130. The first to third semiconductor layers SM1 to SM3 may at least partially overlap with the first to third gate electrodes GE1 to GE3, respectively. The first to third semiconductor layers SM1 to SM3 may be made of at least one of amorphous silicon, polycrystalline silicon and an oxide semiconductor. As used herein, the phrase "two elements overlap with one another" means that the two elements overlap with one another in the vertical direction with respect to the lower substrate 110.

Although not shown in the drawings, in some embodiments, an ohmic contact element may be additionally disposed adjacent to or in some area of each of the first to third semiconductor layers SM1 to SM3. The ohmic contact element may be made of n+ hydrogenated amorphous silicon that is highly doped with n-type impurities, or may be made of silicide. When the first to third semiconductor layers SM1 to SM3 include oxide semiconductor, the ohmic contact element may be eliminated.

First to third data lines DL1 to DL3, first to third source electrodes SE1 to SE3, and first to third drain electrodes DE1 to DE3 may be disposed on the first to third semiconductor layers SM1 to SM3 and the first insulating layer 130, respectively.

The first to third data lines DL1 to DL3 may extend in the second direction dr2 and may intersect with the first gate line GL1. The first to third data lines DL1 to DL3 may be insulated from the first gate line GL1 and the first to third gate electrodes GE1 to GE3 by the first insulating layer 130.

The first to third data lines DL1 to DL3 may provide the data voltages to the first to third source electrodes SE1 to SE3, respectively. The data voltages may be applied from an external source and may have a varying voltage level. The grayscale of each of the first to third pixels PX1 to PX3 may change in response to the voltage level of the data voltages.

The first to third source electrodes SE1 to SE3 may branch off from the first to third data lines DL1 to DL3, respectively, and at least partially overlap with the first to third gate electrodes GE1 to GE3, respectively.

As shown in FIG. 1, the first to third drain electrodes DE1 to DE3 may be spaced apart from the first to third source electrodes SE1 to SE3, respectively, with the first to third semiconductor layers SM1 to SM3 therebetween, and at least partially overlaps with the first to third gate electrodes GE1 to GE3, respectively.

As shown in FIG. 1, the first to third source electrodes SE1 to SE3 may have a C-shape that surrounds the first to third drain electrodes DE1 to DE3, respectively, with a predetermined spacing. However, this is merely illustrative, and the shape of the first to third source electrode SE1 to SE3 may have a variety of shapes, such as a bar shape.

The first to third data lines DL1 to DL3, the first to third source electrodes SE1 to SE3, and the first to third drain electrodes DE1 to DE3 may be made of the same material. For example, the first to third data lines DL1 to DL3, the first to third source electrodes SE1 to SE3, and the first to third drain electrodes DE1 to DE3 may be made of aluminum, copper, silver, molybdenum, chrome, titanium, tantalum, or an alloy thereof. In addition, they may have, but is not limited to, a multi-layer structure comprised of a lower layer (not shown) such as a refractory metal and a low-resistance upper layer (not shown) formed on the lower layer.

The first gate electrode GE1, the first semiconductor layer SM1, the first source electrode SE1, and the first drain electrode DE1 may form a first thin-film transistor Q1 which is a switching element. The first thin-film transistor Q1 may be a switching element for controlling the first pixel PX1. The second gate electrode GE2, the second semiconductor layer SM2, the second source electrode SE2, and the second drain electrode DE2 may form a second thin-film transistor Q2 which is a switching element. The second thin-film transistor Q2 may be a switching element for controlling the second pixel PX2. The third gate electrode GE3, the third semiconductor layer SM3, the third source electrode SE3, and the third drain electrode DE3 may form a third thin-film transistor Q3 which is a switching element. The third thin-film transistor Q3 may be a switching element for controlling the third pixel PX3.

A passivation layer 140 may be disposed on the first insulating layer 130 and the first to third thin-film transistors Q1 to Q3. The passivation layer 140 may be made of an inorganic insulating material and may cover the thin-film transistors. The passivation layer 140 may protect the thin-film transistors and may prevent the constituent material of a second insulating layer 150, which will be described later, from flowing into the semiconductor layers.

The second insulating layer 150 may be disposed on the passivation layer 140. The second insulating layer 150 may be made of an insulating material and may be an organic layer made of an organic material. The second insulating layer 150 may eliminate level differences created by the elements disposed thereunder. In other words, the upper surface of the second insulating layer 150 may be substantially flat.

First to third contact holes CNT1 to CNT3 may be formed in the passivation layer 140 and the second insulating layer 150. A part of the first to third drain electrodes DE1 to DE3 may be exposed in the direction perpendicular to the lower substrate 110. The first to third contact holes CNT1 to CNT3 may be formed by penetrating the passivation layer and the second insulating layer 150 in the direction perpendicular to the lower substrate 110. The part of the first to third pixel electrodes PE1 to PE3 disposed on the second insulating layer 150 may be connected to the first to third drain electrodes DE1 to DE3 via the first to third contact holes CNT1 to CNT3, respectively.

In some exemplary embodiments, part of the passivation layer 140 and the second insulating layer 150 may be omitted or replaced with another layer. For example, a single layer may perform both the functionalities of the passivation layer 140 and the second insulating layer 150.

The first to third pixel electrodes PE1 to PE3 may be disposed on the second insulating layer 150.

The first pixel electrode PE1 may be physically connected to the first drain electrode DE1 through the first contact hole CNT1 and may receive the data voltage from the first drain electrode DE. The first pixel electrode PE1 may be physically connected to the second drain electrode DE2 through the first contact hole CNT1 and may receive the data voltage from the second drain electrode DE2. The third pixel electrode PE3 may be physically connected to the third drain electrode DE3 through the third contact hole CNT3 and may receive the data voltage from the third drain electrode DE3.

The first to third pixel electrodes PE1 to PE3 may be made of a transparent conductive material such as indium tin oxide (ITO), indium zinc oxide (IZO), indium tin zinc oxide (ITZO), and Al-doped zinc oxide (AZO).

Hereinafter, the layout in plane of the first to third pixel electrodes PE1 to PE3 will be described. The first pixel electrode PE1 disposed in the first pixel PX1 will be described as an example. The same description may be applied to the second pixel electrode PE2 disposed in the second pixel PX2 and the third pixel electrode PE3 disposed in the third pixel PX3.

The first pixel electrode PE1 may include a first stem electrode STE1, first branch electrodes BE1, and a first connecting electrode CNE1.

The first stem electrode STE1 may extend in the first direction dr1 or the second direction dr2. In other words, a first portion of the first stem electrode STE1 may extend in the first direction dr1 and second portion of the first stem electrode STE1 may extend in the second direction dr2, which is perpendicular to the first direction. Put another way, the first stem electrode STE1 may have an L-shape. According to an exemplary embodiment, in the diagram shown in FIG. 1, the first stem electrode STE1 is disposed adjacent to the left side and the lower side of a first opening OP1, and may electrically connect the first branch electrodes BE1 with one another.

The first opening OP1 may be one of a plurality of openings formed in a light-shielding member BM, which will be described later, and may be disposed in the first pixel PX1. The first opening OP1 may transmit light, and a user may see the light transmitted through the first opening OP1. Similarly, the second pixel PX2 may include a second opening OP2, and the third pixel PX3 may include a third opening OP3.

In some exemplary embodiments, the light-shielding member BM may be omitted. When the light-shielding member BM is eliminated, the area where some of the elements of the pixel electrode that control the transmittance of the liquid-crystal layer 300 are disposed may correspond to the first to third openings OP1 to OP3. For example, the first stem electrode STE1 and the first branch electrodes BE1 may be disposed in the area corresponding to the first opening OP1.

The width of the first stem electrode STE1 may be 1 µm or more. In an exemplary embodiment, the width of the first stem electrode STE1 may be between 3 µm to 6 µm. The width of the first stem electrode STE1 may refer to the distance between both sides of the first stem electrode STE1 measured in the direction perpendicular to the direction in which the first stem electrode STE1 is extended.

The first branch electrodes BE1 may correspond to a pattern of plurality of transparent conductive materials extending from the first stem electrode STE1. Each of the first branch electrodes BE1 may extend in a direction different from the first direction dr1 and the second direction dr2. All of the first branch electrodes BE1 disposed in the first opening OP1 may extend in the same direction. In other words, the direction in which each of the first branch electrodes BE1 disposed in the first opening OP1 extend may be different from the first direction dr1 and the second direction dr2, and the first branch electrodes BE1 may be parallel to one another. For example, the direction in which each of the first branch electrodes BE1 extend may make an angle between 30 and 60 degrees with the first direction dr1, and may extend toward the right upper end of FIG. 1.

The width of the first branch electrodes BE1 may be smaller than the width of the first stem electrode STE1. For example, each of the first branch electrodes BE1 may have a width of 1 to 4 µm. The width of the first branch electrodes BE1 may refer to the distance between both sides measured in the direction perpendicular to the direction in which the first branch electrodes BE1 extend.

A plurality of first slits SL1 may be formed, each between every two of the first branch electrodes BE1. The first slits SL1 may be portions where no transparent conductive material is disposed. Each of the first slits SL1 may be disposed between the first branch electrodes BE1 and accordingly may extend in the same direction as the two adjacent first branch electrodes BE1. The width of the first slits SL1 may be larger than the width of the first branch electrodes BE1. For example, the first slits SL1 may have a width of 4 to 8 µm. The width of the first slits SL1 may refer to the distance between both sides measured in the direction perpendicular to the direction in which the first slits SL1 extend.

That is, in light of only the first stem electrode STE1 and the first branch electrodes BE1, the first pixel electrode PE1 may have a structure that is asymmetric with respect to both of the first direction dr1 and the second direction dr2.

The first connecting electrode CNE1 may be electrically connected to the first drain electrode DE1 through the first contact hole CNT1, and may deliver the data voltage supplied from the first drain electrode DE1 to the first stem electrode STE1 and one of the first branch electrodes BE1. Unlike the first stem electrode STE1 and the first branch electrodes BE1 which are used to generate the electric field for controlling the liquid-crystal molecules LC, the first connecting electrode CNE1 is used to provide the data voltage to the first stem electrode STE1 and the first branch electrodes BE1. Therefore, the first connecting electrode CNE1 may be disposed in a light-shielding area BMA outside the first opening OP1.

According to an exemplary embodiment, the plurality of first branch electrodes BE1 may extend from the stem electrode disposed at the left lower end toward the right upper end of FIG. 1. When the data voltage is supplied to the pixel electrode, most of the liquid-crystal molecules LC arranged in the liquid-crystal layer 300 may be controlled so that they are tilted toward the left lower end of FIG. 1. As most of the liquid-crystal molecules LC disposed in the liquid-crystal layer 300 are tilted toward the left lower end of FIG. 1 throughout the first opening OP1, there may be differences in the brightness when the first opening OP1 is observed from the front, when it is observed from one side, and when it is observed from the opposite side.

In view of this, according to an exemplary embodiment, the light having passed through the liquid-crystal layer 300 may be scattered by a wavelength conversion layer described below such that the light exits at various angles. Consequently, a user may not perceive a brightness difference between the front and the sides. For this reason, it is possible to design the pixel electrode to increase transmittance without considering the brightness difference between the front and the sides. In addition, the plurality of first branch electrodes BE1 may be extended in one direction as in the exemplary embodiment of the present disclosure. That is, the liquid-crystal molecules LC may be controlled such that they are tilted in one direction throughout the first opening OP1. In other words, it may be possible to apply a one-domain structure that controls the liquid-crystal molecules LC such that they are tilted in one direction throughout the first opening OP1.

Similarly, the second pixel electrode PE2 includes a second stem electrode STE2, second branch electrodes BE2, and a second connecting electrode CNE2. In addition, the third pixel electrode PE3 includes a third stem electrode STE3, third branch electrodes BE3, and a third connecting electrode CNE3. The second stem electrode STE2 and the third stem electrode STE3 may have the same structure as the first stem electrode STE1. The second branch electrodes BE2 and the third branch electrodes BE3 may have the same structure as the first branch electrodes BE1. In addition, the second connecting electrode CNE2 and the third connecting electrode CNE3 may have the same structure as the first connecting electrode CNE1. Accordingly, the redundant descriptions will be omitted.

A first alignment layer 160 may be disposed on the first to third pixel electrodes PE1 to PE3.

The first alignment layer 160 may control the orientation and the initial alignment angle of the liquid-crystal molecules LC. The first alignment layer 160 may include an alignment material. The alignment material may be an organic polymer material. The organic polymer material may include at least one of polyimide, for example, polyamic acid and polysiloxane. The first alignment layer 160 may have grooves in the upper surface that extend along the orientation. Herein, the orientation refers to a direction in which the liquid-crystal molecules LC are tilted, and may be the same as the direction in which the applied alignment material is scraped off via a rubbing process at the time of producing the first alignment layer 160. According to an exemplary embodiment, the orientation may be the direction extending from the right upper end toward the left lower end of FIG. 1.

Instead of the grooves, the first alignment layer 160 may be formed by applying an alignment material including an alignment solution containing the main chain and side chains of the first alignment layer 160 and a reactive mesogen (RM) added thereto. The main chain may include polyimide, and the side chains may include vertical director and a group of polymerization inhibitors. In some exemplary embodiments, the first alignment layer 160 may be omitted.

Next, the top plate 200 will be described.

An upper substrate 210 may face the lower substrate 110. The upper substrate 210 may be made of transparent glass, plastic, etc., and in an exemplary embodiment, may be made of the same material as the lower substrate 110.

The light-shielding member BM may be disposed on the surface of the upper substrate 210 facing the lower substrate 110. In FIG. 1, the opening where no light-shielding member BM is disposed may correspond to one of the first to third opening OP1 to OP3, and the region where the light-shielding member BM is disposed may be the light-shielding area (BMA). The light-shielding blocking member BM may block the transmission of light outside the first to third openings OP1 to OP3. The light-shielding member BM may be made of a material that blocks light. In an exemplary embodiment, the light-shielding member BM may be made of an organic material or a metallic material including chrome. Although the light-shielding member BM is disposed in the top plate 200 according to the exemplary embodiment of the present disclosure, this is merely illustrative. The light-shielding member BM may also be disposed on the bottom plate 100. Furthermore, if another element serves to block light, the light-shielding member BM may be omitted.

A first filter 220 and a first transmissive layer 241 may be disposed on the surface of the light-shielding member BM facing the lower substrate 110.

The first filter 220 may overlap with a first wavelength conversion layer WC1, a second wavelength conversion layer WC2, and a second transmissive layer 242.

The first filter 220 may block light having a first wavelength range and may transmit light having a second wavelength range and light having a third wavelength range. The first filter 220 will be described in more detail with respect to the first wavelength conversion layer WC1. The light having the first wavelength range supplied to the first wavelength conversion layer WC1 may be converted into the light having the second wavelength range by first wavelength conversion material WC1a. However, some of the light having the first wavelength range supplied to the first wavelength conversion layer WC1 may fail to meet the first wavelength conversion material WC1a. When this happens, the light of the first wavelength range may be mixed with the light of the second wavelength range converted by the first wavelength conversion material WC1a, thereby causing color mixing. In this regard, the first filter 220 blocks the light still having the first wavelength range even after having passed through the first wavelength conversion layer WC1, thereby preventing color mixing and improving color purity.

The first to third wavelength ranges may be different from one another. In an exemplary embodiment, the first wavelength range may have a central wavelength from approximately 420 nm to 480 nm. Accordingly, the light having the first wavelength range may be blue light. In an exemplary embodiment, the second wavelength range may have a central wavelength from approximately 600 nm to 670 nm. Accordingly, the light having the second wavelength range may be red light. In an exemplary embodiment, the third wavelength range may have a central wavelength from approximately 500 nm to 570 nm. Accordingly, the light having the third wavelength range may be green light.

In the following description, the light having the first wavelength range will be described as blue light, the light having the second wavelength range as red light, and the light having the third wavelength range as green light. Accordingly, the first filter 220 may block blue light and transmit red light and green light. That is, in an exemplary embodiment, the first filter 220 may be a blue cut-off filter. The first filter 220 may be formed of either a single layer or multiple layers.

The first transmissive layer 241 may be disposed to overlap with the third pixel PX3. The transmissive layer 241 may include a third light-transmitting resin 241a and a light-scattering material 241b.

The light-scattering material 241a may be dispersed in the third light-transmitting resin 241b to scatter light supplied to the first transmissive layer 241, such that the scattered light exits. The exiting light may be scattered in various directions irrespectively of the incident angle and may be unpolarized light. Herein, an unpolarized light refers to the light that does not consist only of polarization components in a particular direction, i.e., that consists of random polarization components not polarized in a particular direction. For example, the unpolarized light may be natural light.

A color conversion layer 230 may be disposed on the surface of the first filter 220 facing the lower substrate 110. The color conversion layer 230 may include the first wavelength conversion layer WC1 and the second wavelength layer WC2.

The first wavelength conversion layer WC1 may overlap with the first pixel PX1. In an exemplary embodiment, the first wavelength conversion layer WC1 may contain a first light-transmitting resin WC1b and first wavelength-converting material WC1a.

The first wavelength-converting material WC1a may be dispersed in the first light-transmitting resin WC1b to convert or shift the light supplied to the first wavelength conversion layer WC1 into the light having the second wavelength range. The light supplied to the first wavelength conversion layer WC1 may be the light having the first wavelength range, that is, blue light. Accordingly, the first wavelength conversion layer WC1 may receive blue light from the outside and convert it into red light.

In an exemplary embodiment, the first wavelength-converting material WC1a may include first quantum dots. The particle size of the first quantum dots is not particularly limited as long as the first wavelength-converting material WC1a can convert the light received from the outside into the light of the second wavelength range. The first wavelength-converting material WC1a may be dispersed and naturally coordinated in the first light-transmitting resin WC1b. The first light-transmitting resin WC1b is not particularly limited as long as it is a transparent medium that does not affect the wavelength conversion of the first wavelength-converting material WC1a and does not cause light absorption.

For example, the first light-transmitting resin WC1b may include epoxy, polystyrene, and acrylate. The first wavelength conversion layer WC1 may include an organic solvent instead of the first light-transmitting resin WC1b. In an exemplary embodiment, the organic solvent may include toluene, chloroform, and ethanol.

The second wavelength conversion layer WC2 may overlap with the second pixel PX1. In an exemplary embodiment, the second wavelength conversion layer WC2 may contain a second light-transmitting resin WC2b and a second wavelength-converting material WC2a.

The second wavelength-converting material WC2a may be dispersed in the second light-transmitting resin WC2b to convert or shift the light supplied to the second wavelength conversion layer WC2 into the light having the third wavelength range. The light supplied to the second wavelength conversion layer WC2 may be blue light, and accordingly, the second wavelength conversion layer WC2 may receive blue light from the outside and convert it into green light.

In an exemplary embodiment, the second wavelength-converting material WC2a may include second quantum dots. The particle size of the second quantum dots is not particularly limited as long as the second wavelength-converting material WC2a can convert the light received from the outside into the light of the third wavelength range. That is, the average particle size of the second wavelength-converting material WC2a may be smaller than the average particle size of the first wavelength-converting material WC1a.

The second wavelength-converting material WC2a may be dispersed and naturally coordinated in the second light-transmitting resin WC2b. The second light-transmitting resin WC2b is not particularly limited as long as it is a transparent medium that does not affect the wavelength conversion performance of the second wavelength-converting material WC2a and does not cause light absorption.

For example, the first light-transmitting resin WC2b may include epoxy, polystyrene, and acrylate. The second wavelength conversion layer WC2 may include an organic solvent instead of the first light-transmitting resin WC2b. In an exemplary embodiment, the organic solvent may include toluene, chloroform, and ethanol.

The first quantum dots and the second quantum dots may be selected from group II-VI compounds, group III-V compounds, group IV-VI compounds, group IV elements, group IV compounds, and a combination thereof.

The group II-VI compounds may be selected from the group including: binary compounds selected from the group including CdSe, CdTe, ZnS, ZnSe, ZnTe, ZnO, HgS, HgSe, HgTe, MgSe, MgS, and a mixture thereof; ternary compounds selected from the group including CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and quaternary compounds selected from the group including HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof.

The group III-V compounds may be selected from the group including: binary compounds selected from the group including GaN, GaP, GaAs, GaSb, AlN, AlP, AlAs, AlSb, InN, InP, InAs, InSb, and a mixture thereof; ternary compounds selected from the group including GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and quaternary compounds selected from the group including GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof.

The group IV-VI compounds may be selected from the group including: binary compounds selected from the group including SnS, SnSe, SnTe, PbS, PbSe, PbTe, and a mixture thereof; ternary compounds selected from the group including SnSeS, SnSeTe, SnSTe, PbSeS, PbSeTe, PbSTe, SnPbS, SnPbSe, SnPbTe, and a mixture thereof; and quaternary compounds selected from the group including SnPbSSe, SnPbSeTe, SnPbSTe, and a mixture thereof. The group IV elements may also be selected from the group including Si, Ge, and a mixture thereof. The group IV compounds may also be binary compounds selected from the group including SiC, SiGe, and a mixture thereof.

The binary compounds, the ternary compounds, or the quaternary compounds may be present in the particles at a uniform concentration, or may be present in the same particles at partially different concentrations. In addition, they may have a core/shell structure in which one quantum dot surrounds another quantum dot. At the interface between the core and the shell, the gradient of the concentrate of atoms in the shell may decrease toward the center.

The first quantum dots and the second quantum dots may have a full width of half maximum (FWHM) of the emission wavelength spectrum of approximately 45 nm or less, preferably approximately 40 nm or less, more preferably approximately 30 nm or less. Within this range, color purity and color gamut can be improved. Also, light emitted through the first quantum dots and the second quantum dots is emitted in all directions, so that the viewing angle can be improved.

In addition, in an exemplary embodiment, the first quantum dots and the second quantum dots may have a spherical shape, a pyramidal shape, and a multi-arm shape, or may be cubic nanoparticles, nanotubes, nanowires, nanofibers, nano-platelets, or the like.

In another exemplary embodiment, each of the first wavelength-converting material WC1a and the second wavelength-converting material WC2a may contain quantum rods or phosphor materials, as well as quantum dots. In an exemplary embodiment, the phosphor may have a size of approximately 100 to 3,000 nm. Further, the phosphor may include yellow, green, and red fluorescent materials.

That is, the first and second wavelength-converting materials WC1a and WC2a may absorb the light supplied to the first wavelength conversion layer WC1 and the second wavelength conversion layer WC2, respectively, to emit light having a central wavelength different that of the absorbed light. More specifically, the first and second wavelength-converting materials WC1a and WC2a may scatter the light incident on the first wavelength conversion layer WC1 and the second wavelength conversion layer WC2, respectively, to emit light in different directions irrespective of the incident angles. That is, the display device according to an exemplary embodiment of the present disclosure can improve the viewing angle by emitting light in various directions through the first and second wavelength-converting materials WC1a and WC2a.

The polarization of the light emitted from the first wavelength conversion layer WC1 and the second wavelength conversion layer WC2 may be cancelled.

A second filter 250 may be disposed on one surface of each of the first wavelength conversion layer WC1, the second wavelength conversion layer WC2, and the first transmissive layer 241 facing the lower substrate 110. In an exemplary embodiment, the second filter 250 may transmit the light having the first wavelength range and may reflect the light having the second wavelength range and the light having the third wavelength range. That is, the second filter 250 may transmit blue light and reflect red light and green light. In this manner, the second filter 250 may improve the emission efficiency of the light emitted from the first wavelength conversion layer WC1 or the second wavelength layer WC2. In an exemplary embodiment, the second filter 250 may surround the first wavelength conversion layer WC1, the second wavelength layer WC2, and the second transmissive layer 242.

For example, the portion of the second filter 250 that surrounds the first wavelength conversion layer WC1 may transmit blue light to supply it to the first wavelength conversion layer WC1. The blue light supplied to the first wavelength conversion layer WC1 may be converted into red light by the first wavelength conversion material WC1a and exit toward the upper substrate 210, that is, to the outside. On the other hand, among the converted red light, light directed toward the lower substrate 110 may be reflected by a part of the second filter 250 surrounding the first wavelength conversion layer WC1.

The second filter 250 may be formed of either a single layer or multiple layers. When the second filter 250 is formed of multiple layers, the second filter 250 may include a layer containing SiNx and a layer containing SiOx. In an exemplary embodiment, the layers containing SiNx and the layers containing SiOx may be alternately stacked.

The display device according to an exemplary embodiment may include the first filter 220 and the second filter 250 to thereby prevent color mixing. In addition, the display device according to an exemplary embodiment may improve the emission efficiency of the light exiting from the first wavelength conversion layer WC1 or the second wavelength conversion layer WC2, thereby improving color gamut.

The second transmissive layer 242 may be disposed on the surface of the second filter 250 facing the lower substrate 110. According to an exemplary embodiment, the second transmissive layer 242 may be disposed between the first wavelength conversion layer WC1 and the second wavelength conversion layer WC2, and between the second wavelength conversion layer WC2 and the first transmissive layer 241. The second transmissive layer 242 may be made of the same material as the first transmissive layer 241.

A planarization layer 260 may be disposed on the surface of the second transmissive layer 242 facing the lower substrate 110. In an exemplary embodiment, the planarization layer 260 may be made of an organic material. When the first wavelength conversion layer WC1, the second wavelength conversion layer WC2, and the transmissive layer 241 have different thicknesses, the planarization layer 260 may regulate the levels of the elements stacked on the surface of the upper substrate 210.

A third insulating layer 270 may be disposed on the surface of the planarization layer 260 facing the lower substrate 110. In an exemplary embodiment, the third insulation layer 270 may be made of an inorganic insulative material such as silicon nitride and silicon oxide. The third insulation layer 270 may be eliminated.

A second polarizing layer 280 may be disposed on the surface of the third insulating layer 270 facing the lower substrate 110. In an exemplary embodiment, the second polarizing layer 280 may include a conductive material that allows electric current to flow. In an exemplary embodiment, the conductive material may include a metal including aluminum (Al), silver (Ag), gold (Au), copper (Cu), and nickel (Ni). In addition, the conductive material may further include titanium (Ti) and molybdenum (Mo).

In an exemplary embodiment, the second polarizing layer 280 may be a wire grid polarizer. Accordingly, the second polarizing layer 280 may include a pattern of plurality of line gratings 281 protruding toward the lower substrate 110. The second polarizing layer 280 may include aluminum, silver, copper, nickel, etc.

For example, after the incident light passes through the second polarizing layer 280, components in parallel with the second polarizing layer 280 may be absorbed or reflected, while only vertical components are transmitted such that polarized light can be produced. It is to be noted that a larger gap between the line grid patterns 281 of the second polarizing layer 280 may achieve more efficient polarization. The second polarizing layer 280 may be formed by nanoimprinting or the like.

The second polarizing layer 280 may further include a capping layer 282. The capping layer 282 can suppress defects such as corrosion of the second polarizing layer 280 and can provide a flat surface over the second polarizing layer 280.

A common electrode CE may be disposed on the surface of the second polarizing layer 280 facing the lower substrate 110. The common electrode CE may overlap with at least a part of each of the first to third pixel electrodes PE1 to PE3. The common electrode CE may be a single, continuous electrode. The common electrode CE may be made of a transparent conductive material such as ITO and IZO or a reflective metal such as aluminum, silver, chrome, or an alloy thereof.

On the surface of the common electrode CE facing the lower substrate 110, an upper alignment layer is disposed. The second alignment layer 290 may have the same structure as the first alignment layer 160 and may perform the same function. The second alignment layer 290 may also be omitted.

Hereinafter, the liquid-crystal layer 300 will be described.

The liquid-crystal layer 300 may include liquid-crystal molecules LC. In an exemplary embodiment, the liquid-crystal molecules LC may have negative dielectric anisotropy. When no electric field is applied to the liquid-crystal layer 300, the liquid-crystal molecules LC 31 may be orientated in a direction perpendicular to the lower substrate 110. When electric field is formed between the lower substrate 110 and the upper substrate 210, the liquid-crystal molecules LC may be rotated or tilted in a particular direction to thereby change the polarization of light supplied to the liquid-crystal layer 300. The liquid-crystal molecules LC may have positive dielectric anisotropy.

Although not shown in the drawings, below the bottom plate 100, i.e., on the surface of the bottom plate 100 opposed to the top plate 200, a backlight unit for providing light toward the bottom plate 100 may be disposed. The LCD device can display a desired image by adjusting the transmittance of light provided from the backlight unit.

Figure 3:
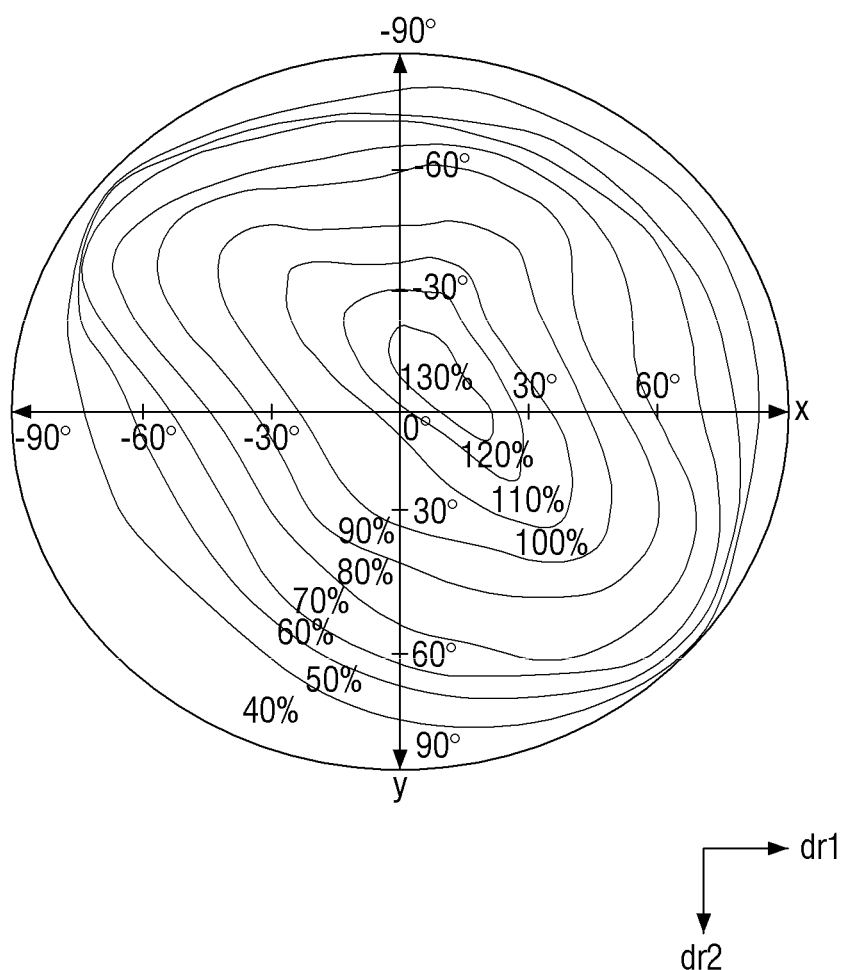
FIG. 3 is a graph showing brightness observed at different positions on the LCD device including the pixel unit according to the embodiment shown in FIGS. 1 and 2.
Figure 4:
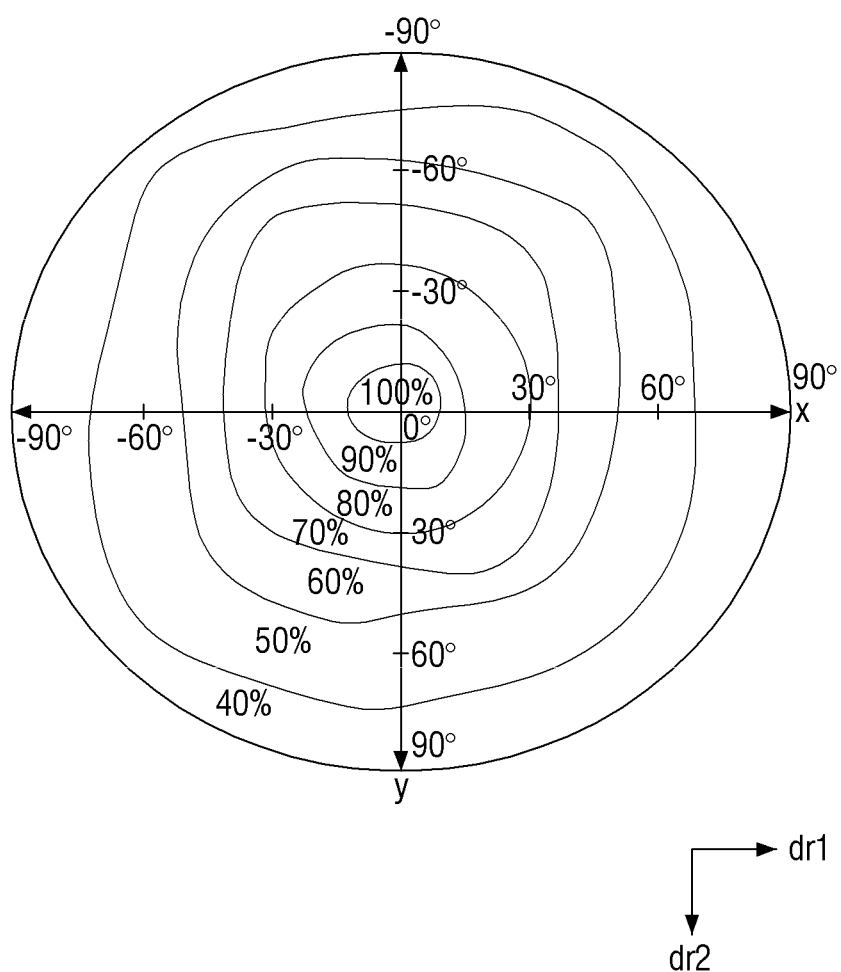
FIG. 4 is a graph showing brightness observed at different positions on an LCD device including pixel units including pixels having four-domain structure.

FIG. 3 is a graph showing brightness observed at different positions on the LCD device including the pixel units according to the embodiment shown in FIGS. 1 and 2. FIG. 4 is a graph showing brightness observed at different positions on an LCD device including pixel units including pixels having four-domain structure.

In each of FIGS. 3 and 4, the center point on the xy plane indicates the brightness of the LCD device observed from the front, and points away from the center point indicate the brightness of the LCD device observed from the sides. That is, the angles marked on the xy plane may indicate angles with a straight line extended in the direction perpendicular to the plane of the LCD device.

The direction in which the x-axis extends may correspond to the first direction dr1 in FIG. 1, while the direction in which the y-axis extends may correspond to the second direction dr2 in FIG. 1.

In FIGS. 3 and 4, the brightness at each position is expressed in percentage (%). The brightness of 100% refers to the maximum brightness in the graph shown in FIG. 4.

It can be seen from FIGS. 3 and 4 that the LCD device including the pixel units PXU according to the embodiment shown in FIGS. 1 and 2 may exhibit higher brightness across most areas compared to the LCD device including pixel units consisting of pixels having the four-domain structure. In particular, it can be seen that in spite of the pixels of the pixel unit PXU according to the embodiment shown in FIGS. 1 and 2 having a pixel electrode structure including only one domain, the brightness deviation at the front and the sides minimally affect the display quality. This may be because the light incident on the wavelength conversion layer is scattered in various angles, as described above.

Figure 5:
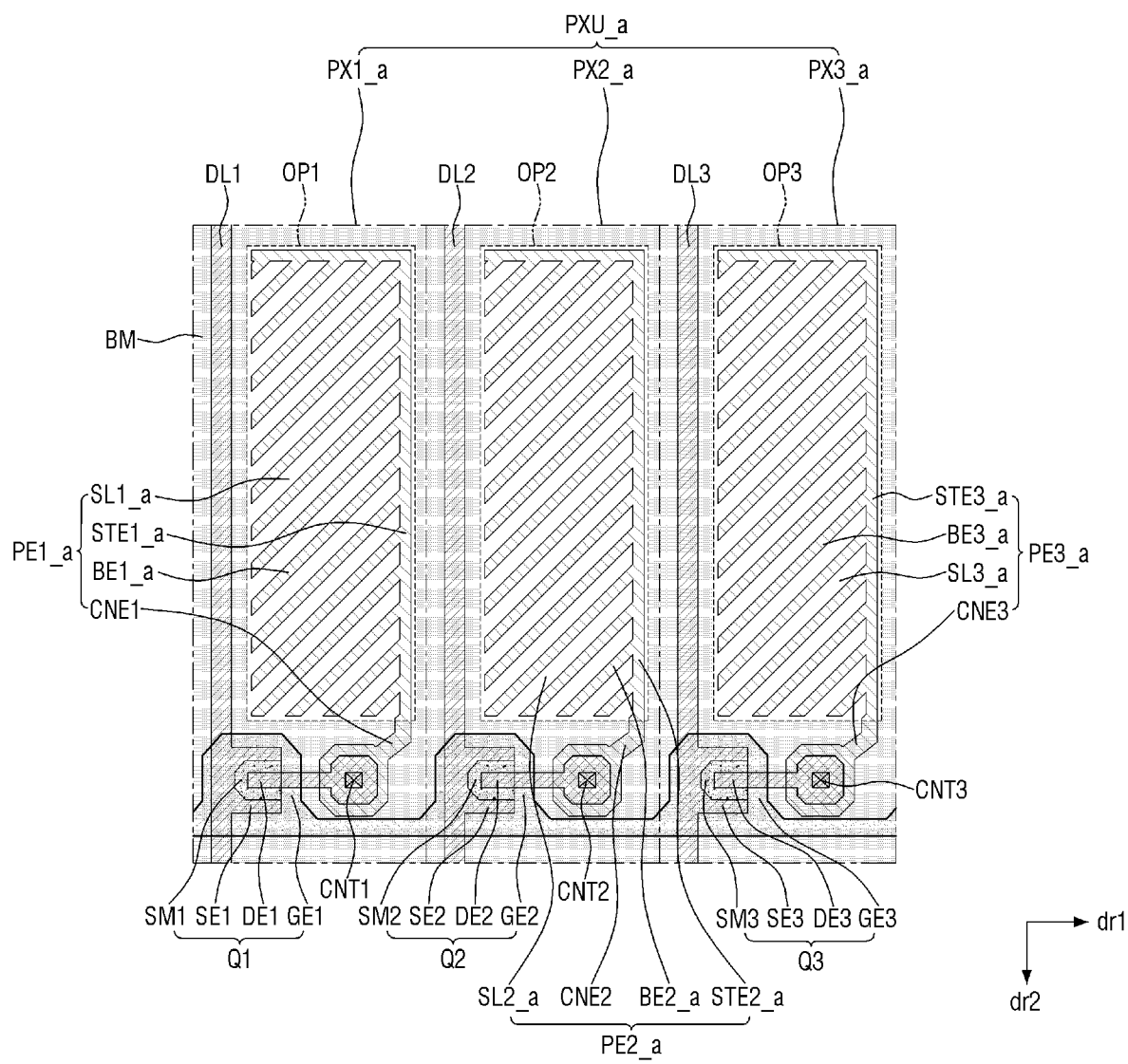
FIGS. 5, 6, and 7 are layout diagrams showing pixel units according to other exemplary embodiments.
Figure 6:
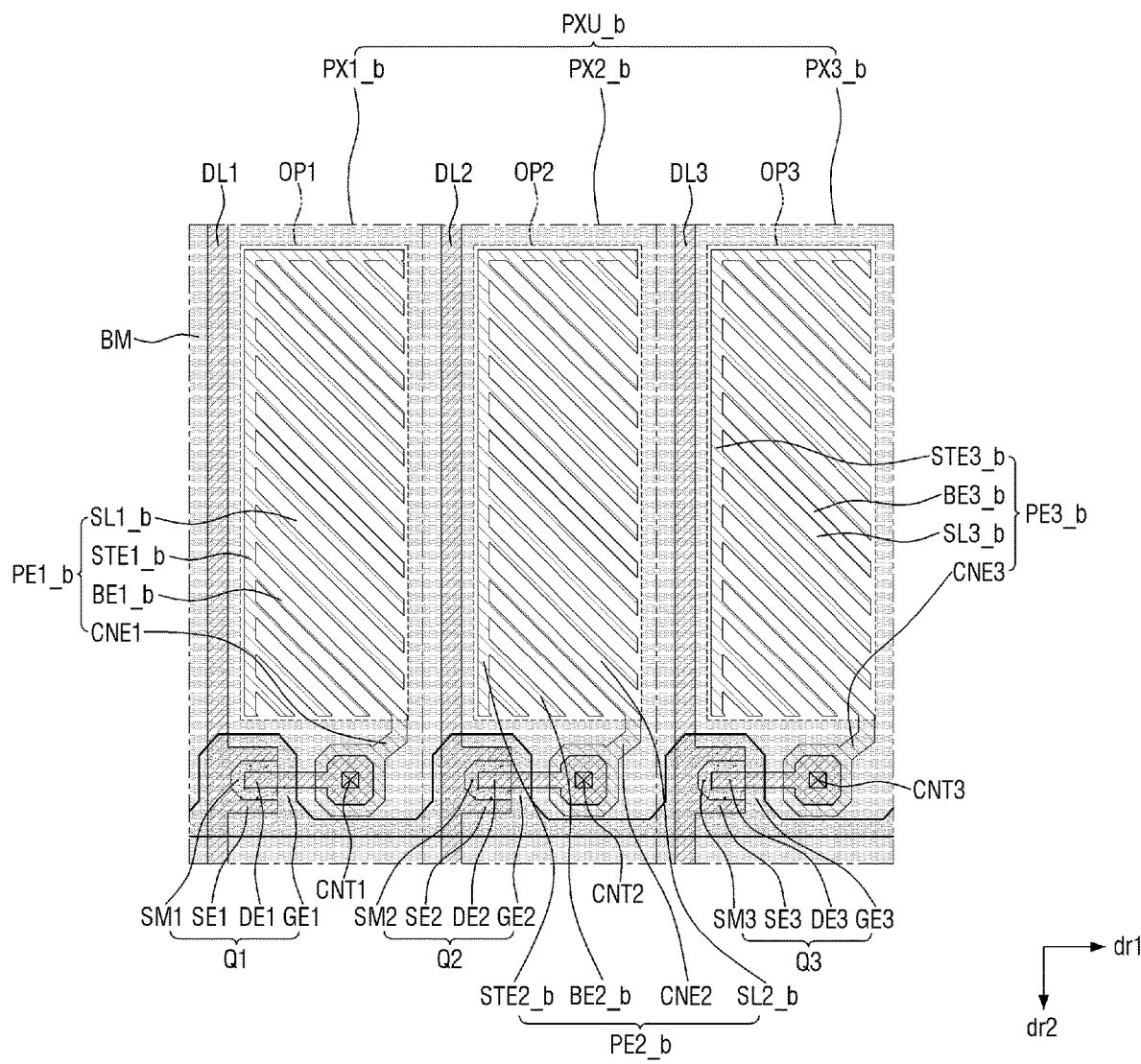
Figure 7:
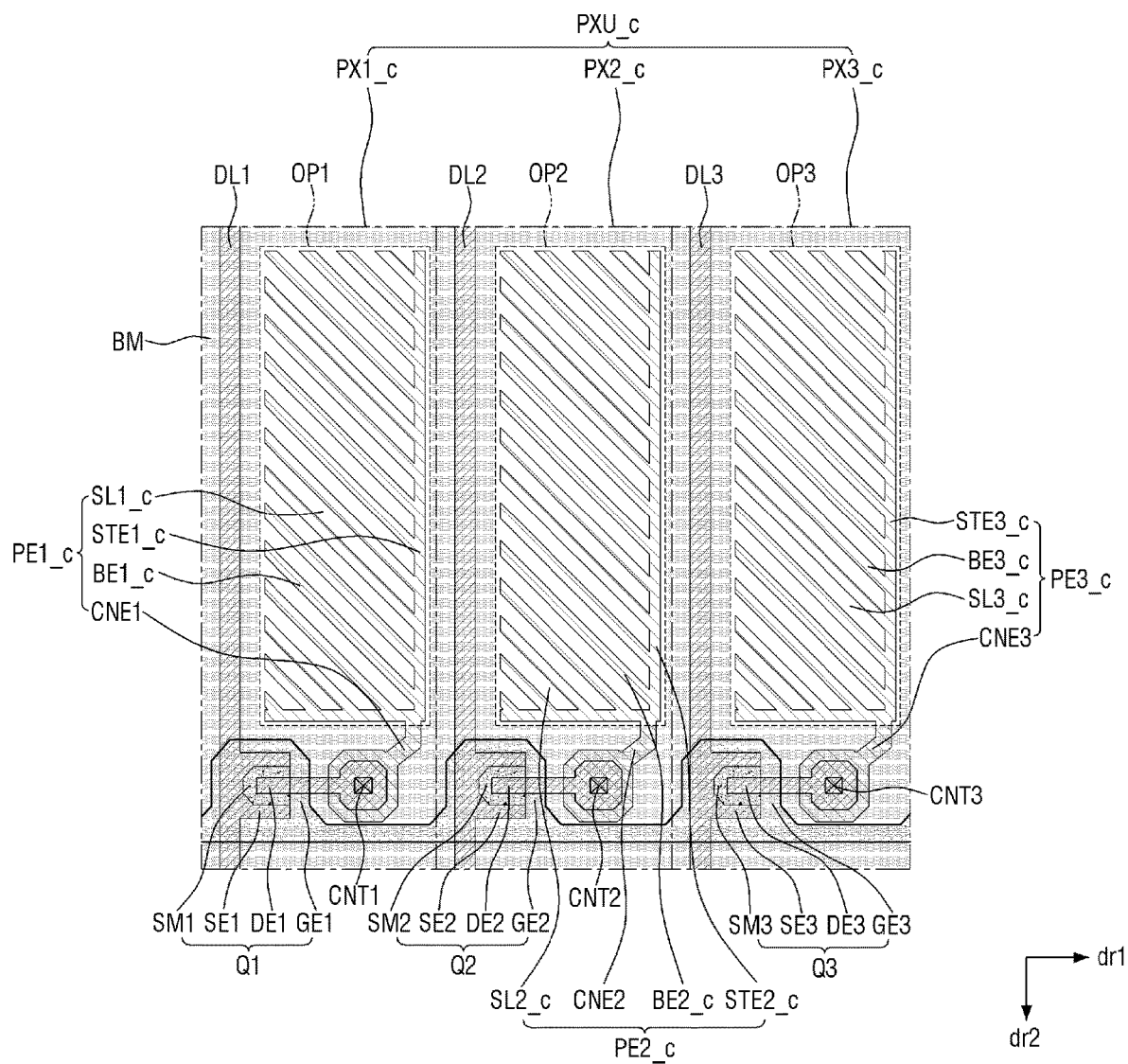

FIGS. 5 to 7 are layout diagrams showing pixel units according to exemplary embodiments.

The elements already described above with respect to FIGS. 5 to 7 will not be described again.

Referring to FIGS. 5 to 7, each of the pixel units (PXU_a in FIG. 5; PXU_b in FIG. 6; and PXU_c in FIG. 7) according to the exemplary embodiments of the present disclosure includes first to third pixels (PX1_a to PX3_a in FIG. 5; PX1_b to PX3_b in FIG. 6; and PX1_c to PX3_c in FIG. 7). The first pixel (PX1_a in FIG. 5; PX1_b in FIG. 6; and PX1_c in FIG. 7) includes a first pixel electrode (PE1_a in FIG. 5; PE1_b in FIG. 6; and PE1_c in FIG. 7. The second pixel (PX2_a in FIG. 5; PX2_b in FIG. 6; and PX2_c in FIG. 7) includes a second pixel electrode (PE2_a in FIG. 5; P21_b in FIG. 6; and PE2_c in FIG. 7. The third pixel (PX3_a in FIG. 5; PX3_b in FIG. 6; and PX3_c in FIG. 7) includes a third pixel electrode (PE3_a in FIG. 5; PE3_b in FIG. 6; and PE3_c in FIG. 7.

The first pixel electrode (PE1_a in FIG. 5; PE1_b in FIG. 6; and PE1_c in FIG. 7) may include a first stem electrode (STE1_a in FIG. 5; STE1_b in FIG. 6; and STE1_c in FIG. 7), first branch electrodes (BE1_a in FIG. 5; BE1_b in FIG. 6; and BE1_c in FIG. 7), and a first connecting electrode (CNE1 in FIGS. 5 to 7). The second pixel electrode (PE2_a in FIG. 5; PE2_b in FIG. 6; and PE2_c in FIG. 7) may include a second stem electrode (STE2_a in FIG. 5; STE2_b in FIG. 6; and STE2_c in FIG. 7), second branch electrodes (BE2_a in FIG. 5; BE2_b in FIG. 6; and BE2_c in FIG. 7), and a second connecting electrode (CNE2 in FIGS. 5 to 7). The third pixel electrode (PE3_a in FIG. 5; PE3_b in FIG. 6; and PE3_c in FIG. 7) may include a third stem electrode (STE3_a in FIG. 5; STE3_b in FIG. 6; and STE3_c in FIG. 7), third branch electrodes (BE3_a in FIG. 5; BE3_b in FIG. 6; and BE3_c in FIG. 7), and a third connecting electrode (CNE3 in FIGS. 5 to 7).

Hereinafter, description will be made focusing on the first pixel electrode (PE1_a in FIG. 5; PE1_b in FIG. 6; and PE1_c in FIG. 7).

According to the exemplary embodiment shown in FIG. 5, a first stem electrode STE1_a may be disposed adjacent to the right and upper sides of the first opening OP1 of FIG. 5. In addition, the plurality of first branch electrodes BE1_a may extend from the right upper end to the left lower end of FIG. 5.

According to the exemplary embodiment shown in FIG. 6, a first stem electrode STE1_b may be disposed adjacent to the left and upper sides of the first opening OP1 of FIG. 6. In addition, the plurality of first branch electrodes BE1_b may extend from the left upper end to the right lower end of FIG. 6.

According to the exemplary embodiment shown in FIG. 7, a first stem electrode STE1_c may be disposed adjacent to the right and lower sides of the first opening OP1 of FIG. 7. In addition, the plurality of first branch electrodes BE1_c may extend from the right lower end to the left upper end of FIG. 7.

That is, the first branch electrodes (BE1_a in FIG. 5; BE1_b in FIG. 6; and BE1_c in FIG. 7) according to the exemplary embodiments of the present disclosure may extend in different directions. It is to be noted that although the first branch electrodes (BE1_a in FIG. 5; BE1_b in FIG. 6; and BE1_c in FIG. 7) extend in different directions, the first pixel electrodes (PE1_a in FIG. 5; PE1_b in FIG. 6; and PE1_c in FIG. 7) include only one domain, and thus the same effect as that of the embodiment shown in FIG. 1 may be achieved.

Figure 8:
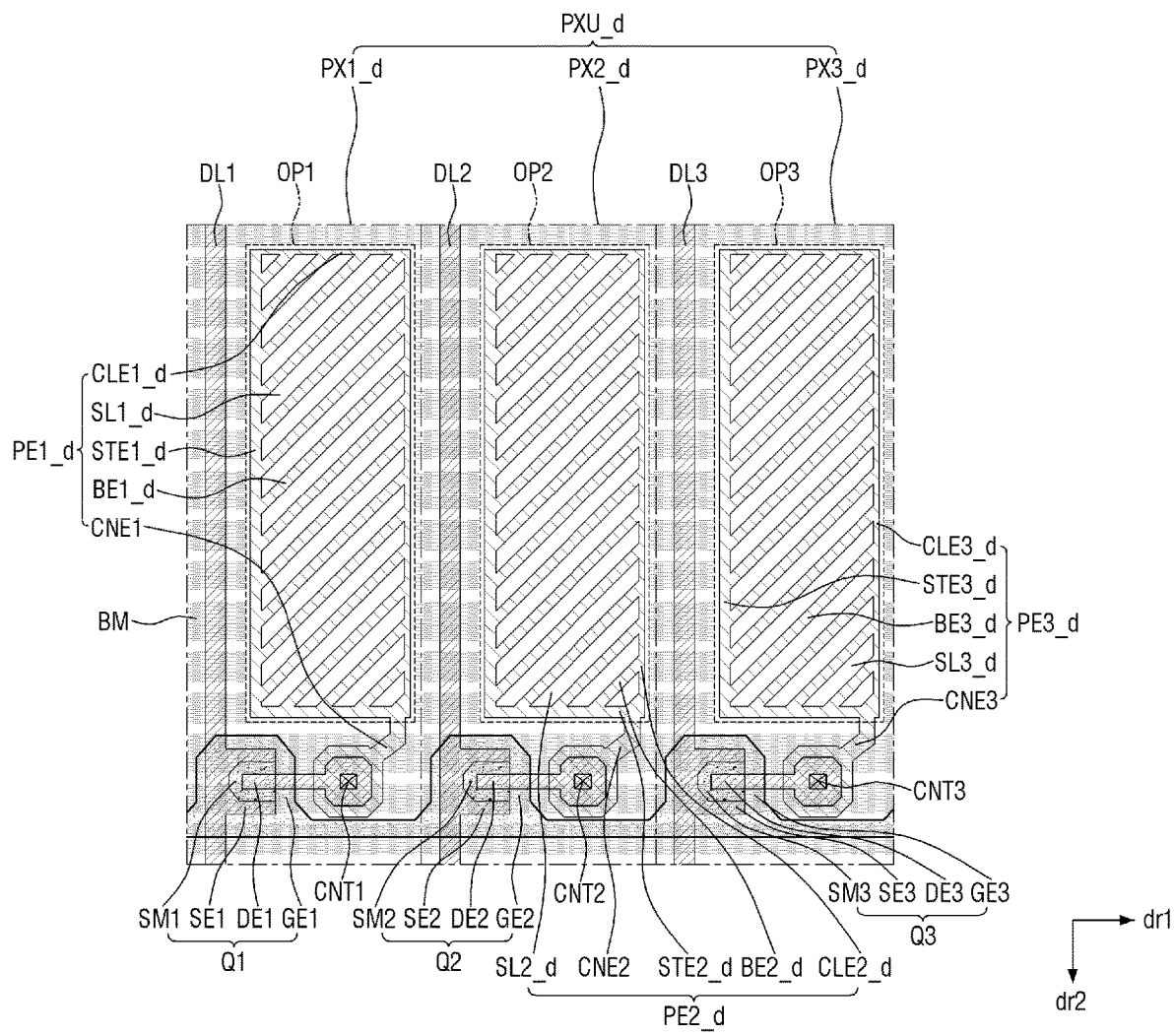
FIG. 8 is a layout diagram showing a pixel unit according to another exemplary embodiment.

FIG. 8 is a layout diagram showing a pixel unit according to another exemplary embodiment.

The elements already described above with respect to FIG. 1 will not be described again.

Referring to FIG. 8, a pixel unit PXU_d according to the exemplary embodiment of the present disclosure includes first to third pixels PX1_d to PX3_d. The first pixel electrode PE1_d includes a first stem electrode STE1_d, first branch electrodes BE1_d, a first connecting electrode CNE1, and a first closing electrode CLE1_d. The second pixel electrode PE2_d includes a second stem electrode STE2_d, second branch electrodes BE2_d, a second connecting electrode CNE2, and a second closing electrode CLE2_h. The third pixel electrode PE3_d includes a third stem electrode STE3_d, third branch electrodes BE3_d, a third connecting electrode CNE3, and a third closing electrode CLE3_d.

Hereinafter, description will be made focusing on the first pixel electrode PE1_d.

The first closing electrode CLE1_d may connect the ends of the first branch electrodes BE1_d with one another. In addition, the first closing electrode CLE1_d may connect the end of the first stem electrode STE1_d with the ends of the first branch electrodes BE1_d adjacent thereto. As a result, the control over the liquid-crystal molecules LC by the first pixel electrode PE1_d can be improved at the ends of the first branch electrodes BE1_d, and the transmittance can be improved.

The width of the first closing electrode CLE1_d may be smaller than the width of the first stem electrode STE1_d. Accordingly, it does not weaken the force by which the liquid-crystal molecules LC are tilted in the intended direction. In other words, as the width of the first closing electrode CLE1_d is smaller than the width of the first stem electrode STE1_d, the liquid-crystal molecules LC can be controlled so that they are tilted from the right upper end to the left lower end of FIG. 8. It is, however, to be understood that the width of the first closing electrode CLE1_d is not limited thereto and may have a different width.

Figure 9:
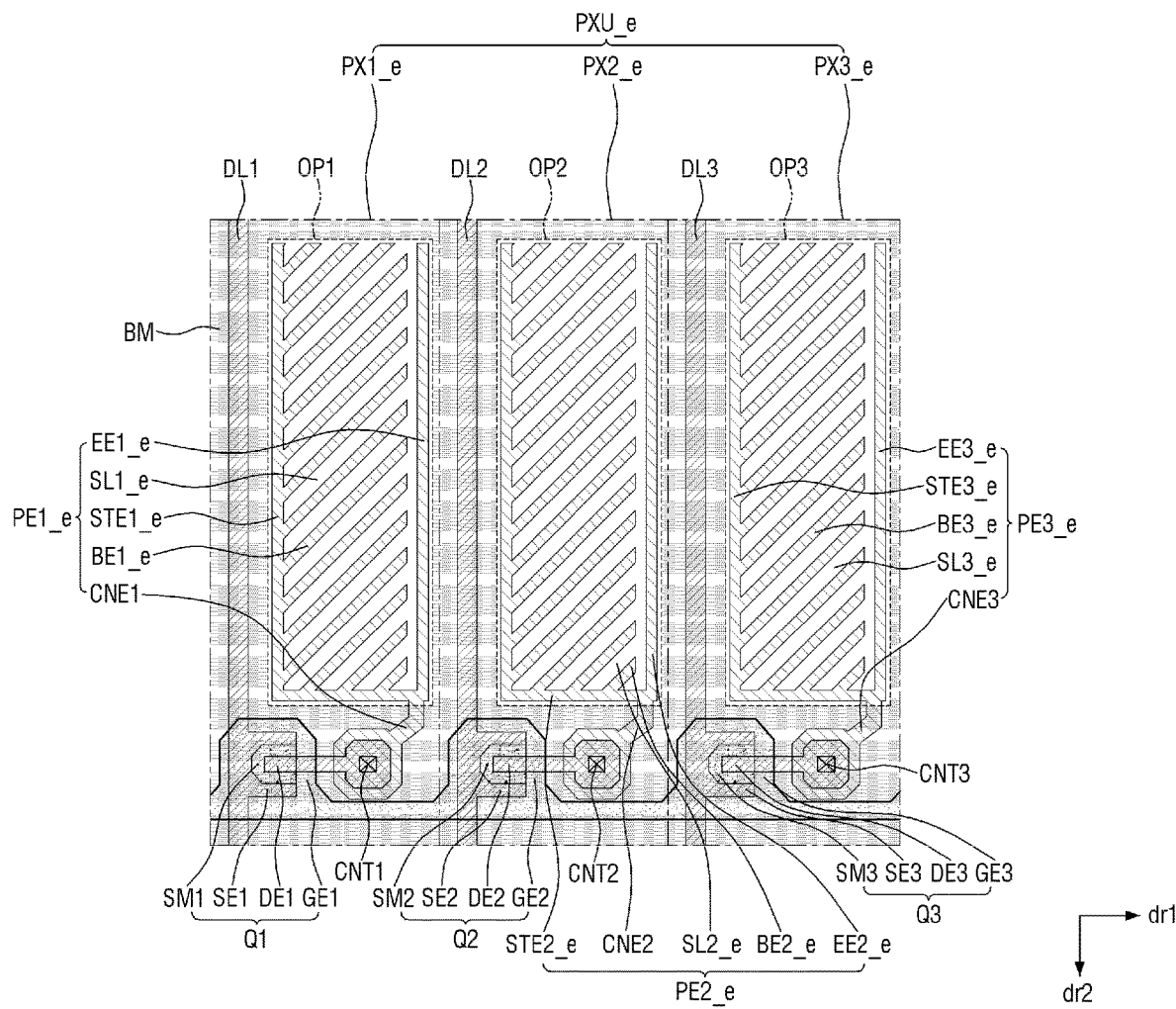
FIG. 9 is a layout diagram showing a pixel unit according to another exemplary embodiment.

FIG. 9 is a layout diagram showing a pixel unit according to another exemplary embodiment.

The elements already described above with respect to FIG. 1 will not be described again.

Referring to FIG. 9, the pixel unit PXU_e according to the exemplary embodiment of the present disclosure includes first to third pixel electrodes PE1_e to PE3_e.

The first to third pixel electrodes PE1_e to PE3_e include first to third stem electrodes STE1_e to STE3_e, first to third branch electrodes BE1_e to BE3_e, first to third connecting electrodes CNE1 to CNE3, and first to third edge electrodes EE1_e to EE3_e, respectively.

Hereinafter, description will be made focusing on the first pixel electrode PE1_e.

The first pixel electrode PE1_e includes the first stem electrode STE1_e, the first branch electrodes BE1_e, the first connecting electrode CNE1 and the first edge electrode EE1_e.

The first edge electrode EE1_e may extend from the end of the first stem electrode STE1_e and extend along at least one of the sides of the first opening OP1 where the first stem electrode STE1_e is not disposed. In other words, the side of the first opening OP1 may be adjacent to one side of the first edge electrode EE1_e, and the ends of the first branch electrodes BE1_e may be adjacent to the opposite side of the first edge electrode EE1_e. As a result, the control over the liquid-crystal molecules LC by the first pixel electrode PE1_e may be improved at the ends of the first branch electrodes BE1_e, and the transmittance may be improved.

Figure 10:
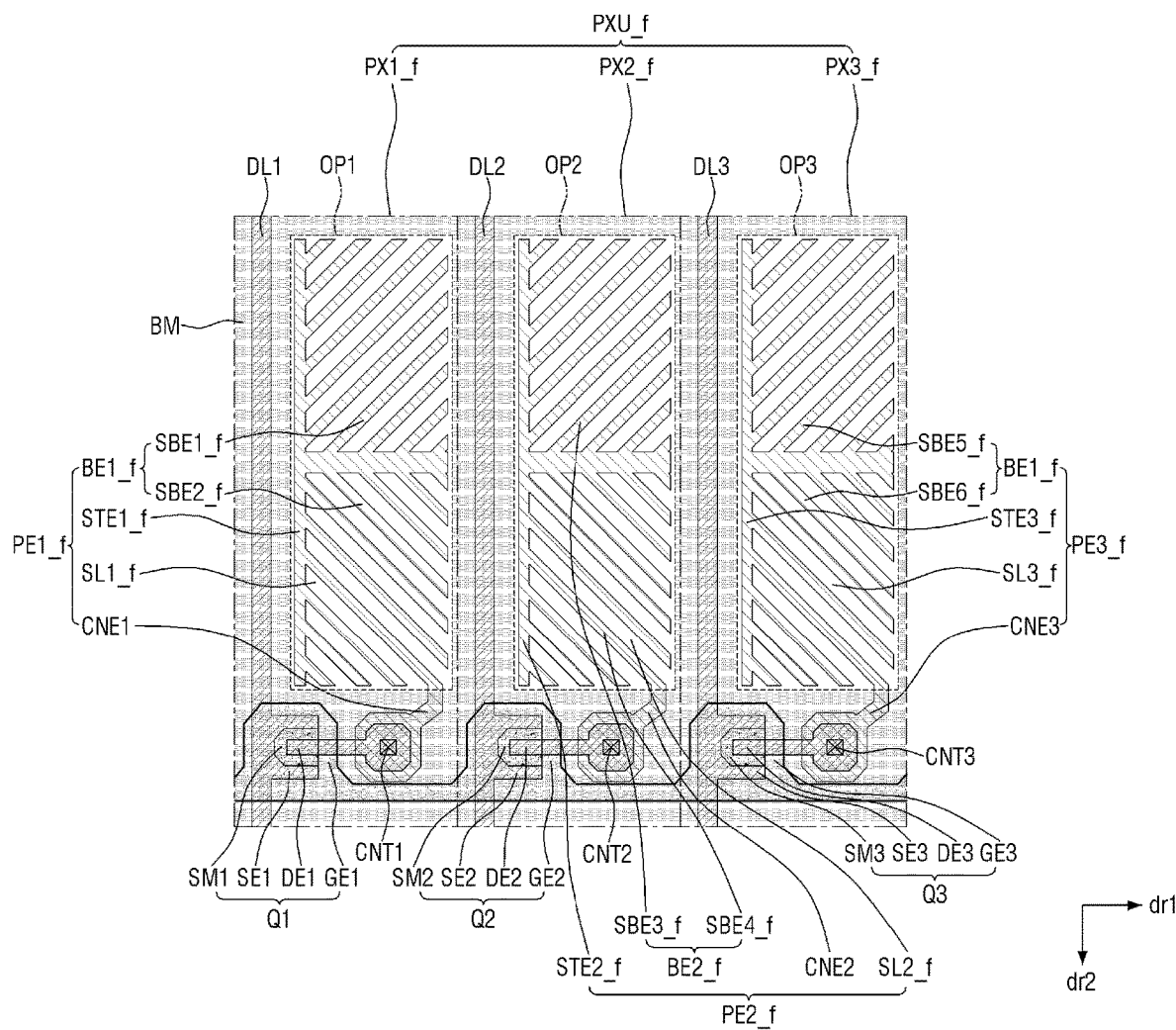
FIG. 10 is a layout diagram showing a pixel unit according to another exemplary embodiment.

FIG. 10 is a layout diagram showing a pixel unit according to another exemplary embodiment.

The elements already described above with respect to FIG. 1 will not be described again.

Referring to FIG. 10, the pixel unit PXU_f according to the exemplary embodiment of the present disclosure includes first to third pixels PX1_f to PX3_f.

The first pixel electrode PE1_f may include a first stem electrode STE1_f, first branch electrodes BE1_f, and a first connecting electrode CNE1. The first branch electrodes BE1_f may include first sub-branch electrodes SBE1_f and second sub-branch electrodes SBE2_f.

The second pixel electrode PE2_f may include a second stem electrode STE2_f, second branch electrodes BE2_f, and a second connecting electrode CNE2. The second branch electrodes BE2_f may include third sub-branch electrodes SBE3_f and fourth sub-branch electrodes SBE4_f.

The third pixel electrode PE3_f may include a third stem electrode STE3_f, third branch electrodes BE3_f, and a third connecting electrode CNE3. The third branch electrodes BE3_f may include fifth sub-branch electrodes SBE5_f and sixth sub-branch electrodes SBE6_f.

Hereinafter, description will be made focusing on the first pixel electrode PE1_f.

The first stem electrode STE1_f may include a portion extending in the first direction dr1 and a portion extending in the second direction dr2. Put another way, the first stem electrode STE1_f may have a T-shape. More specifically, the first stem electrode STE1_f may include the portion that is adjacent to the side of the first opening OP1 and extends in the second direction dr2, and the portion that traverses the center of the first opening OP1 in the first direction dr1. Accordingly, the first branch electrodes BE1_f extending from the first stem electrode STE1_f may extend in two directions.

Specifically, the first branch electrodes BE1_f may include the first sub-branch electrodes SBE1_f and the second sub-branch electrodes SBE2_f extending in different directions. The first sub-branch electrodes SBE1_f may extend from the right lower end to the left upper end of FIG. 10. The second sub-branch electrode SBE2_f may extend from the left upper end to the right lower end of FIG. 10. In other words, the first pixel electrode PE1_f may have a two-domain structure. That is, in light of only the first stem electrode STE1_f and the first branch electrodes BE1_f, the first pixel electrode PE1_f may have a structure that is asymmetric with respect to either the first direction dr1 or the second direction dr2.

Since the LCD device according to the exemplary embodiment of the present disclosure includes the wavelength conversion layer, the transmittance may be improved while the brightness difference between the front and the sides can be reduced as compared with the four-domain structure.

More detailed descriptions thereof will be given with reference to FIG. 11.

Figure 11:
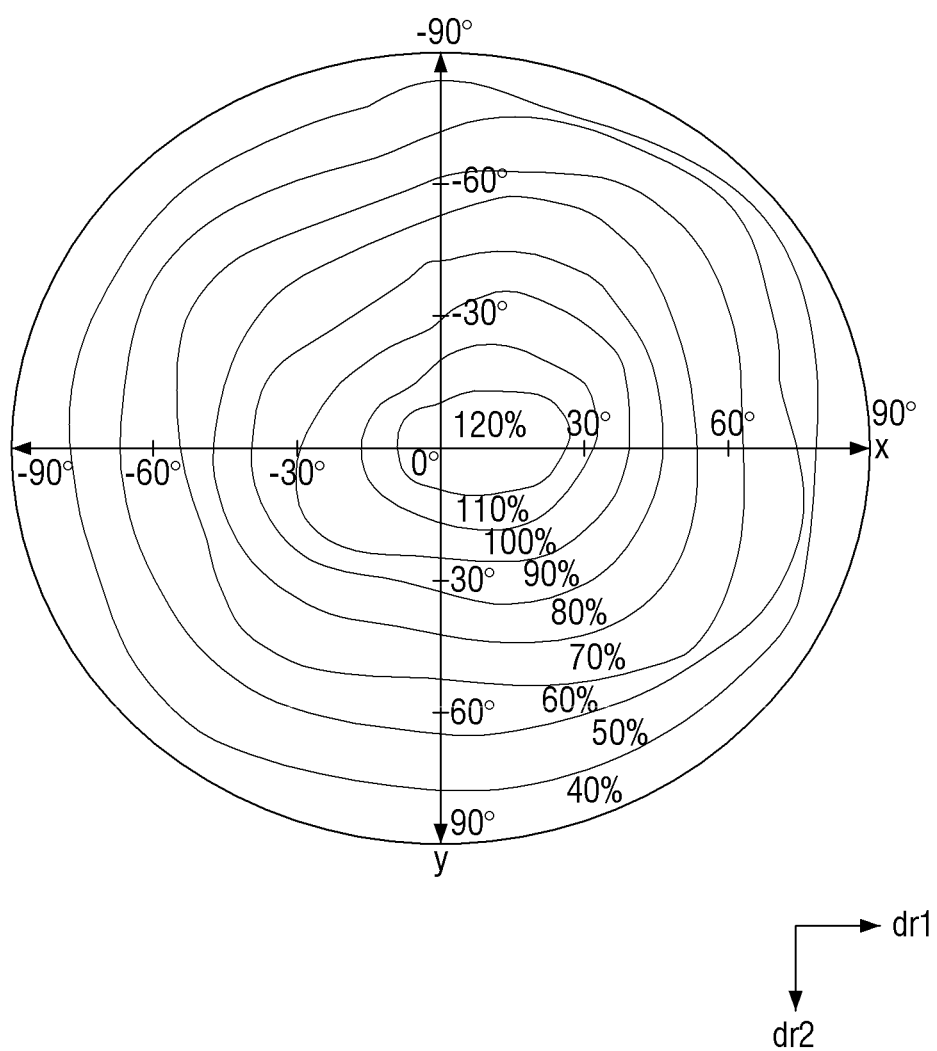
FIG. 11 is a graph showing brightness observed at different positions on the LCD device including the pixel unit according to the embodiment shown in FIG. 10.

FIG. 11 is a graph showing brightness observed at different positions on the LCD device including the pixel units according to the exemplary embodiment shown in FIG. 10.

In FIG. 11, the center point on the xy plane indicates the brightness of the LCD device observed from the front, and points away from the center point indicate the brightness of the LCD device observed from the sides. That is, the angles marked on the xy plane may indicate angles with the straight line extended in a direction perpendicular to the plane of the LCD device.

The direction in which the x-axis extends may correspond to the first direction dr1 in FIG. 10, while the direction in which the y-axis extends may correspond to the second direction dr2 in FIG. 1.

In FIG. 11, the brightness at each position is expressed in percentage (%). The brightness of 100% refers to the maximum brightness in the graph shown in FIG. 4.

It can be seen from FIG. 11 that the LCD device including the pixel unit PXU_f according to the embodiment shown in FIG. 10 may exhibit higher brightness across most areas compared to the LCD device including pixel units consisting of pixels having four domains. Furthermore, it can be seen that in spite of the pixels of the pixel unit PXU according to the embodiment shown in FIG. 10 having a pixel electrode structure including only two domains, the brightness deviations at the front and the side minimally affects the display quality. This may be because the light incident on the wavelength conversion layer is scattered in various angles, as described above.

Figure 12:
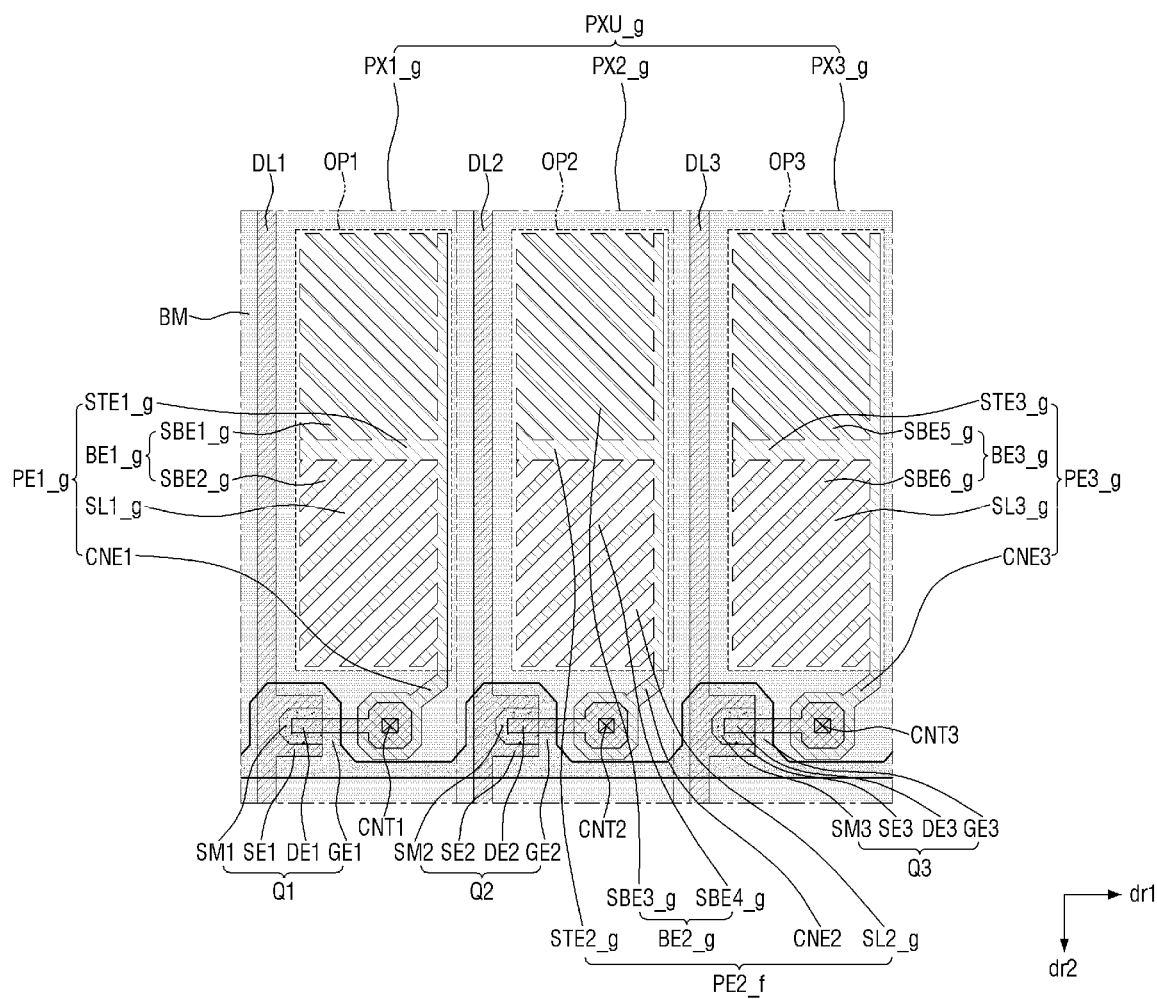
FIG. 12 is a layout diagram showing a pixel unit according to another exemplary embodiment.

FIG. 12 is a layout diagram showing a pixel unit according to another exemplary embodiment.

The elements already described above with respect to FIG. 10 will not be described again.

Referring to FIG. 12, the pixel unit PXU_g according to an exemplary embodiment may include first to third pixels PX1_g to PX3_g. The first to third pixels PX1_g to PX3_g may include first to third pixel electrodes PE1_g to PE3_g, respectively.

The first pixel electrode PE1_g may include a first stem electrode STE1_g, first branch electrodes BE1_g, and a first connecting electrode CNE1. The first branch electrodes BE1_g may include first sub-branch electrodes SBE1_g and second sub-branch electrodes SBE2_g.

The second pixel electrode PE2_g may include a second stem electrode STE2_g, second branch electrodes BE2_g, and a second connecting electrode CNE2. The second branch electrodes BE2_g may include third sub-branch electrodes SBE3_g and fourth sub-branch electrodes SBE4_g.

The third pixel electrode PE3_g may include a third stem electrode STE3_g, third branch electrodes BE3_g, and a third connecting electrode CNE3. The third branch electrodes BE3_g may include fifth sub-branch electrodes SBE5_g and sixth sub-branch electrodes SBE6_g.

Hereinafter, description will be made focusing on the first pixel electrode PE1_e.

According to the exemplary embodiment of the present disclosure, the first sub-branch electrodes SBE1_g may extend from the right lower end to the left upper end of FIG.

12. In addition, the plurality of second branch electrodes SBE2_g may extend from the right upper end to the left lower end of FIG. 12. Accordingly, the portion of the first stem electrode STE1_g that extends in the second direction dr2 may be disposed adjacent to the right side of the first opening OP1 in FIG. 10.

Figure 13:
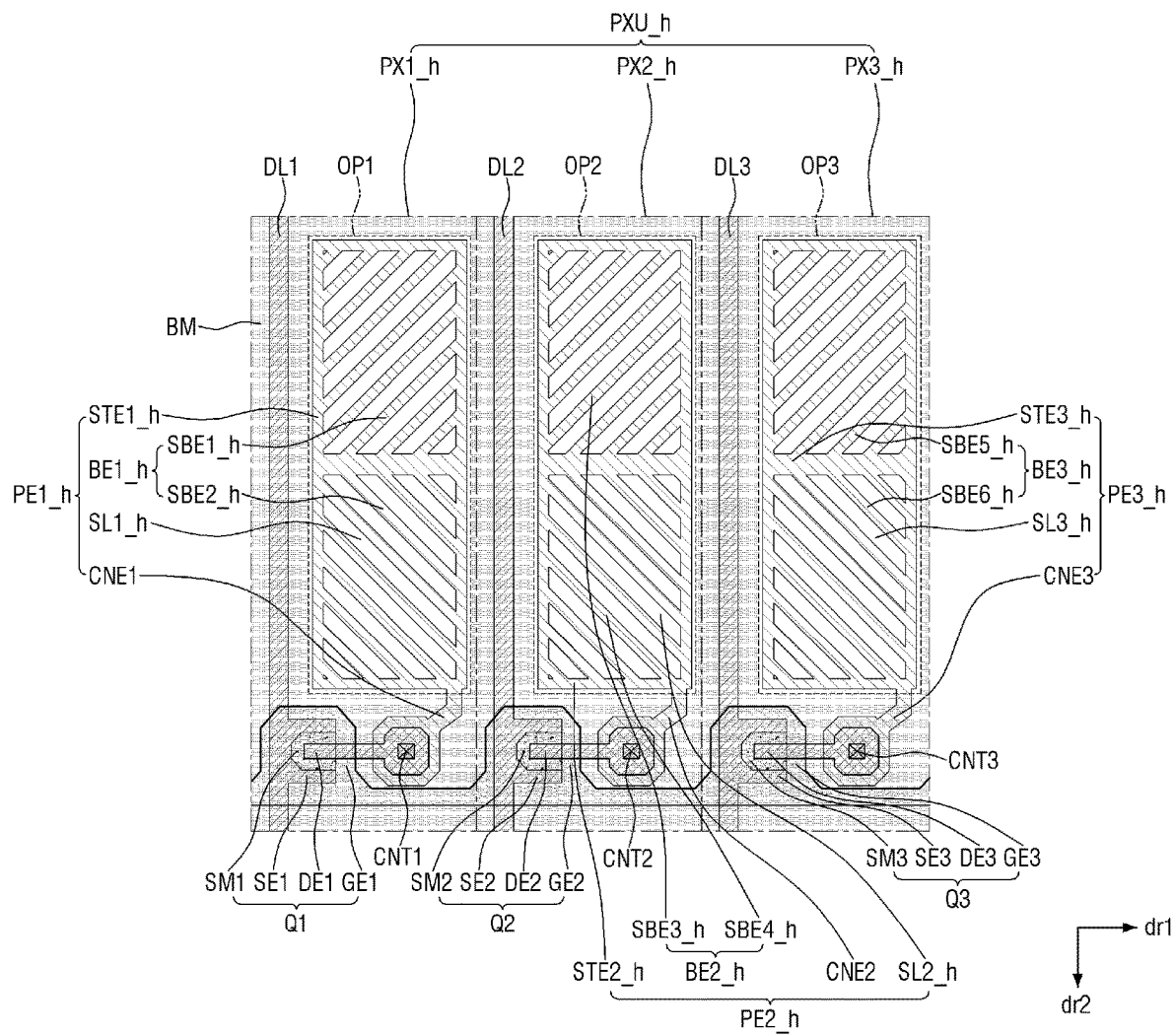
FIG. 13 is a layout diagram showing a pixel unit according to another exemplary embodiment.

FIG. 13 is a layout diagram showing a pixel unit according to another exemplary embodiment.

The elements already described above with respect to FIG. 10 will not be described again.

Referring to FIG. 13, the pixel unit PXU_h according to an exemplary embodiment of the present disclosure may include first to third pixels PX1_h to PX3_h.

The first pixel electrode PE1_h may include a first stem electrode STE1_h, first branch electrodes BE1_h, a first connecting electrode CNE1, and a first closed electrode CLE1_h. The first branch electrodes BE1_h may include first sub-branch electrodes SBE1_h and second sub-branch electrodes SBE2_h.

The second pixel electrode PE2_h may include a second stem electrode STE2_h, second branch electrodes BE2_h, a second connecting electrode CNE2, and a second closing electrode CLE2_h. The second branch electrodes BE2_h may include third sub-branch electrodes SBE3_h and fourth sub-branch electrodes SBE4_h.

The third pixel electrode PE3_h may include a third stem electrode STE3_h, third branch electrodes BE3_h, a third connecting electrode CNE3, and a third closing electrode CLE3_h. The third branch electrodes BE3_h may include fifth sub-branch electrodes SBE5_h and sixth sub-branch electrodes SBE6_h.

Hereinafter, description will be made focusing on the first pixel electrode PE1_h.

The first closing electrode CLE1_h may connect the ends of the first branch electrodes BE1_h with one another. Specifically, the first closing electrode CLE1_h may connect the ends of the first sub-branch electrodes SBE1_h with one another and may connect the ends of the second sub-branch electrodes SBE2_h with one another. In addition, the first closing electrode CLE1_h may connect the ends of the first stem electrode STE1_h with the ends of the first branch electrodes BE1_h adjacent thereto. As a result, the control over the liquid-crystal molecules LC by the first pixel electrode PE1_h may be improved at the ends of the first branch electrodes BE1_h, and the transmittance may be improved.

Figure 14:
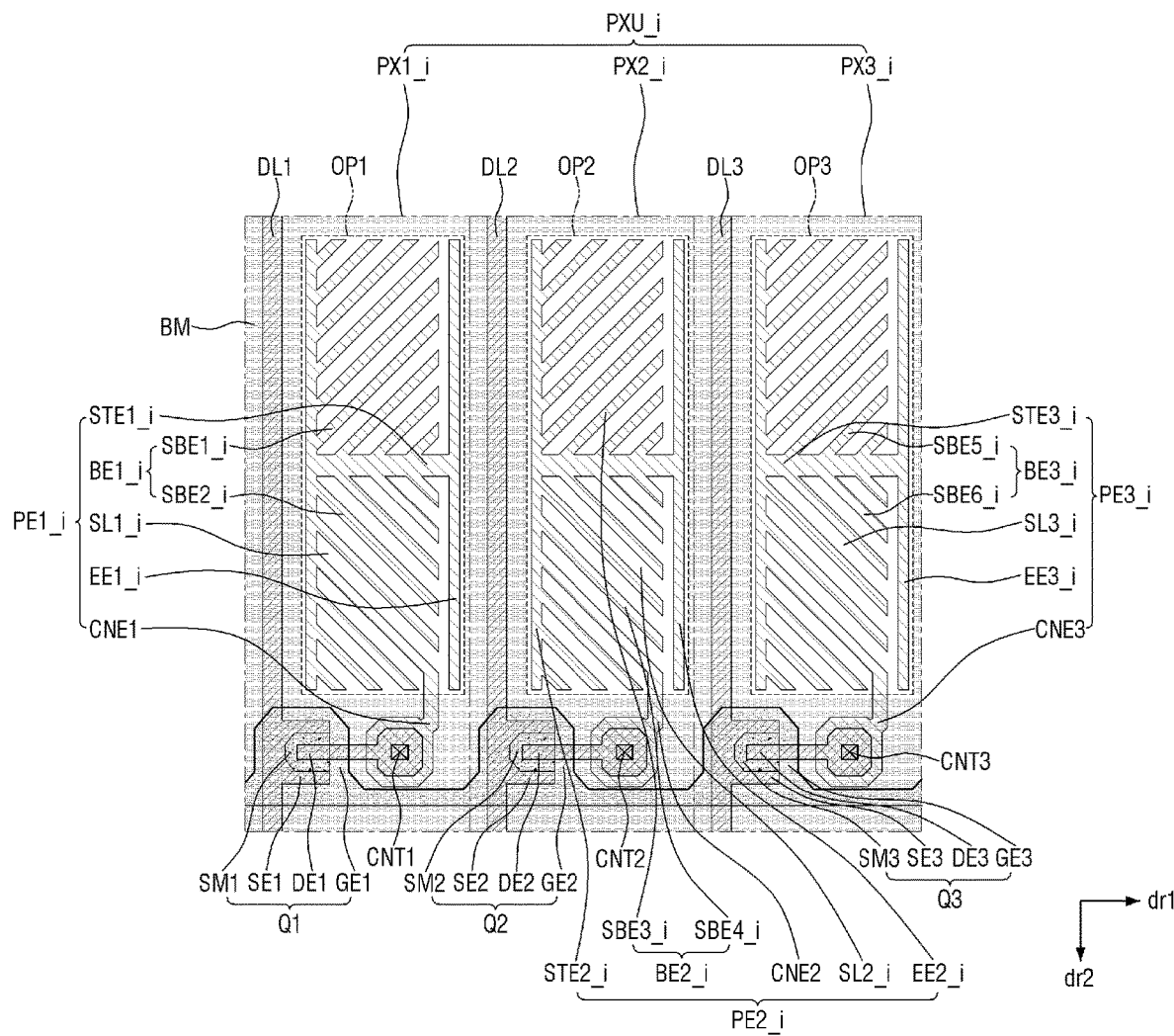
FIG. 14 is a layout diagram showing a pixel unit according to another exemplary embodiment.

FIG. 14 is a layout diagram showing a pixel unit according to another exemplary embodiment.

The elements already described above with respect to FIG. 10 will not be described again.

Referring to FIG. 14, the pixel unit PXU_i according to an exemplary embodiment may include first to third pixel electrodes PE1_i to PE3_i.

The first pixel electrode PE1_i may include the first stem electrode STE1_i, the first branch electrodes BE1_i, the first connecting electrode CNE1 and a first edge electrode EE1_i. The first branch electrodes BE1_i may include first sub-branch electrodes SBE1_i and second sub-branch electrodes SBE2_i.

The second pixel electrode PE2_i includes the second stem electrode STE2_i, the second branch electrodes BE2_e, the second connecting electrode CNE2 and a second edge electrode EE2_i. The second branch electrodes BE2_i include third sub-branch electrodes SBE3_i and fourth sub-branch electrodes SBE4_i.

The third pixel electrode PE3_i may include the third stem electrode STE3_i, the third branch electrodes BE3_i, the third connecting electrode CNE3 and a third edge electrode EE3_i. The third branch electrodes BE3_i may include fifth sub-branch electrodes SBE5_i and sixth sub-branch electrodes SBE6_i.

Hereinafter, description will be made focusing on the first pixel electrode PE1_i.

The first edge electrode EE1_i may extend from the end of the first stem electrode STE1_i, more specifically, from the end of the portion of the first stem electrode STE1_i extending in the first direction dr1, and may extend along at least one of the sides of the first opening OP1 where the first stem electrode STE1_i is not disposed. In other words, the side of the first opening OP1 may be adjacent to one side of the first edge electrode EE1_i, and the ends of the first branch electrodes BE1_i may be adjacent to the opposite side of the first edge electrode EE1_i. As a result, the control over the liquid-crystal molecules LC by the first pixel electrode PE1_i may be improved at the ends of the first branch electrodes BE1_i, and the transmittance may be improved.

Figure 15:
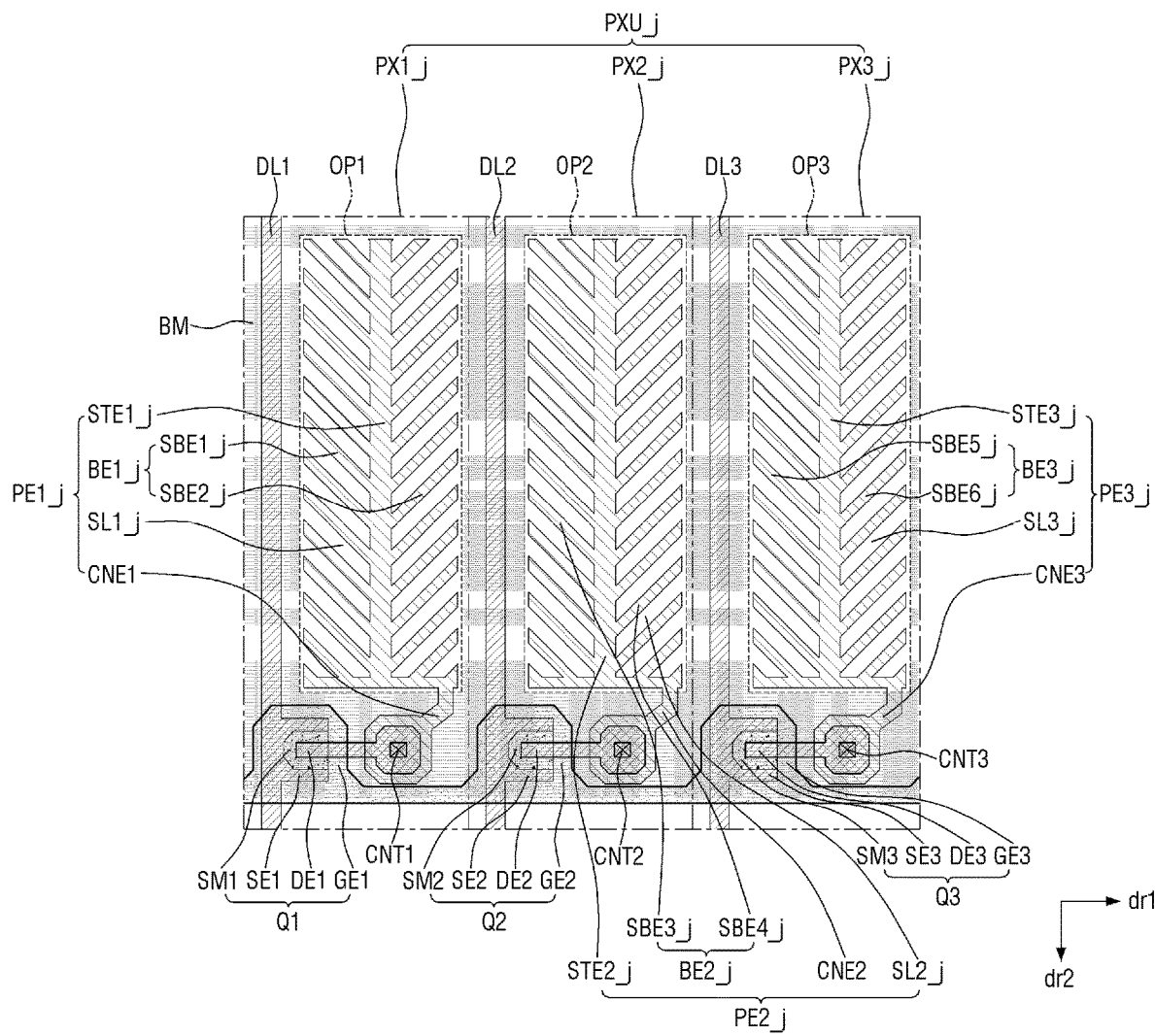
FIG. 15 is a layout diagram showing a pixel unit according to another exemplary embodiment.

FIG. 15 is a layout diagram showing a pixel unit according to another exemplary embodiment.

The elements already described above with respect to FIG. 1 will not be described again.

Referring to FIG. 15, the pixel unit PXU_j according to the exemplary embodiment of the present disclosure may include first to third pixels PX1_j to PX3_j.

The first pixel electrode PE1_j may includes a first stem electrode STE1_j, first branch electrodes BE1_j, and a first connecting electrode CNE1. The first branch electrodes BE1_j may include first sub-branch electrodes SBE1_j and second sub-branch electrodes SBE2_j.

The second pixel electrode PE2_j may include a second stem electrode STE2_j, second branch electrodes BE2_j, and a second connecting electrode CNE2. The second branch electrodes BE2_j may include third sub-branch electrodes SBE3_j and fourth sub-branch electrodes SBE4_j.

The third pixel electrode PE3_j may include a third stem electrode STE3_j, third branch electrodes BE3_j, and a third connecting electrode CNE3. The third branch electrodes BE3_j may include fifth sub-branch electrodes SBE5_j and sixth sub-branch electrodes SBE6_j.

Hereinafter, description will be made focusing on the first pixel electrode PE1_j.

The first stem electrode STE1_j may include a portion extending in the first direction dr1 and a portion extending in the second direction dr2. Put another way, the first stem electrode STE1_j may have a T-shape. More specifically, the first stem electrode STE1_j may include the portion that is adjacent to the side of the first opening OP1 and extends in the first direction dr1, and the portion that traverses the center of the first opening OP1 in the second direction dr2. Accordingly, the first branch electrodes BE1_j extending from the first stem electrode STE1_j may extend in two directions.

Specifically, the first branch electrodes BE1_j may include the first sub-branch electrodes SBE1_j and the second sub-branch electrodes SBE2_j extending in different directions. The first sub-branch electrodes SBE1_j may extend from the right lower end to the left upper end of FIG. 15. The second sub-branch electrodes SBE2_j may extend from the left lower end to the right upper end of FIG. 15. In other words, the first pixel electrode PE1_j may have a two-domain structure. That is, in light of only the first stem electrode STE1_j and the first branch electrodes BE1_j, the first pixel electrode PE1_*j* may have a structure that is asymmetric with respect to either the first direction dr1 or the second direction dr2.

Since the LCD device according to the exemplary embodiment of the present disclosure may include the wavelength conversion layer, the transmittance may be improved while the brightness difference between the front and the sides may be reduced compared to a four-domain structure.

Figure 16:
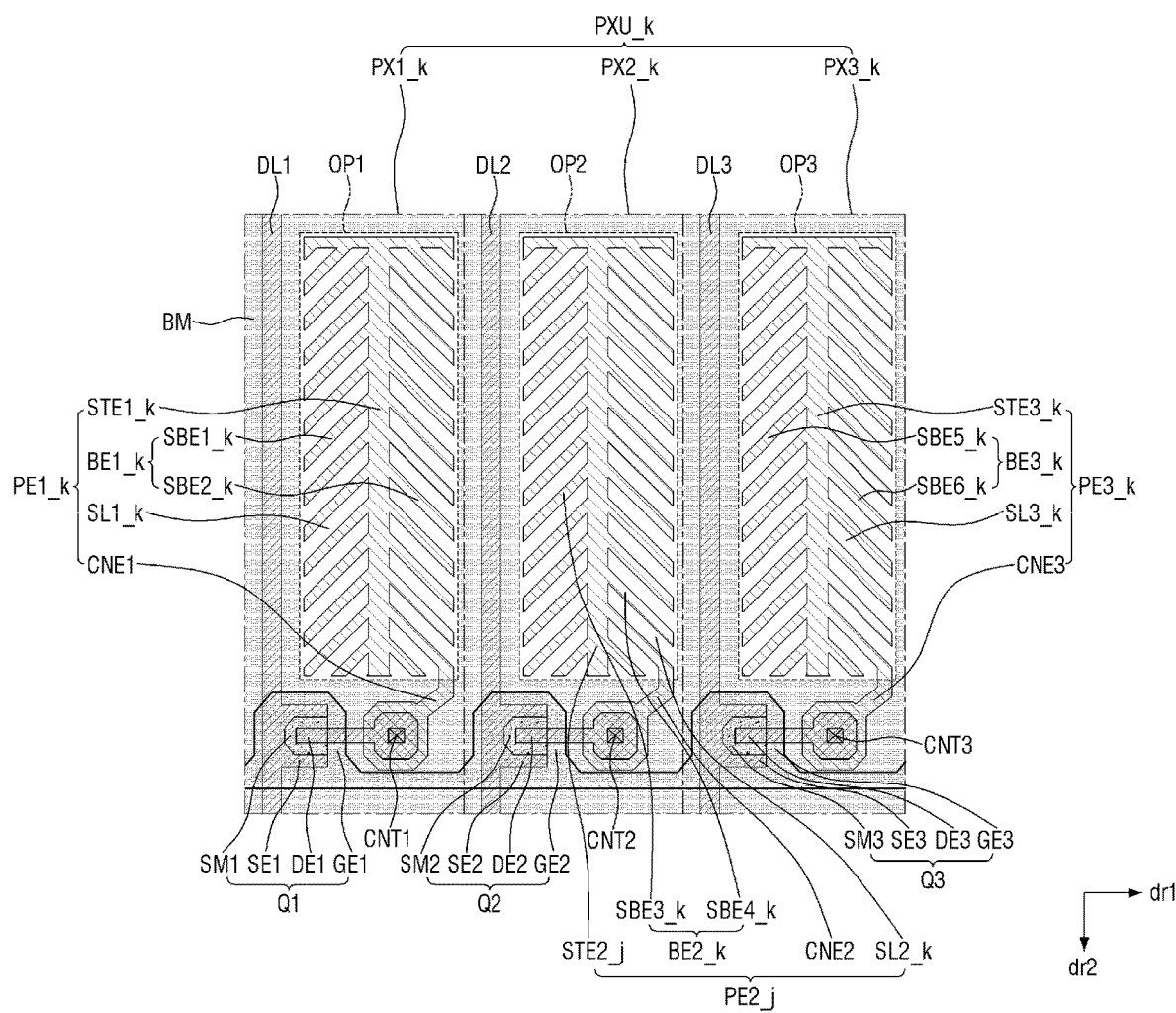
FIG. 16 is a layout diagram showing a pixel unit according to another exemplary embodiment.

FIG. 16 is a layout diagram showing a pixel unit according to another exemplary embodiment.

The elements already described above with respect to FIG. 15 will not be described again.

Referring to FIG. 16, the pixel unit PXU_k according to the exemplary embodiment of the present disclosure may include first to third pixels PX1_*k* to PX3_*k*. The first to third pixels PX1_*k* to PX3_*k* may include first to third pixel electrodes PE1_*k* to PE3_*k*, respectively.

The first pixel electrode PE1_*k* may include a first stem electrode STE1_*k*, first branch electrodes BE1_*k*, and a first connecting electrode CNE1. The first branch electrodes BE1_*k* may include first sub-branch electrodes SBE1_*k* and second sub-branch electrodes SBE2_*k*.

The second pixel electrode PE2_*k* may include a second stem electrode STE2_*k*, second branch electrodes BE2_*k*, and a second connecting electrode CNE2. The second branch electrodes BE2_*k* may include third sub-branch electrodes SBE3_*k* and fourth sub-branch electrodes SBE4_*k*.

The third pixel electrode PE3_*k* may include a third stem electrode STE3_*k*, third branch electrodes BE3_*k*, and a third connecting electrode CNE3. The third branch electrodes BE3_*k* may include fifth sub-branch electrodes SBE5_*k* and sixth sub-branch electrodes SBE6_*k*.

Hereinafter, description will be made focusing on the first pixel electrode PE1_*k*.

According to the exemplary embodiment of the present disclosure, the first sub-branch electrodes SBE1_*k* may extend from the right upper end to the left lower end of FIG. 16. In addition, the plurality of second branch electrodes SBE2_*k* may extend from the left upper end to the right lower end of FIG. 12. Accordingly, the portion of the first stem electrode STE1_*k* that extends in the first direction dr1 can be disposed adjacent to the lower side of the first opening OP1 in FIG. 10.

Figure 17:
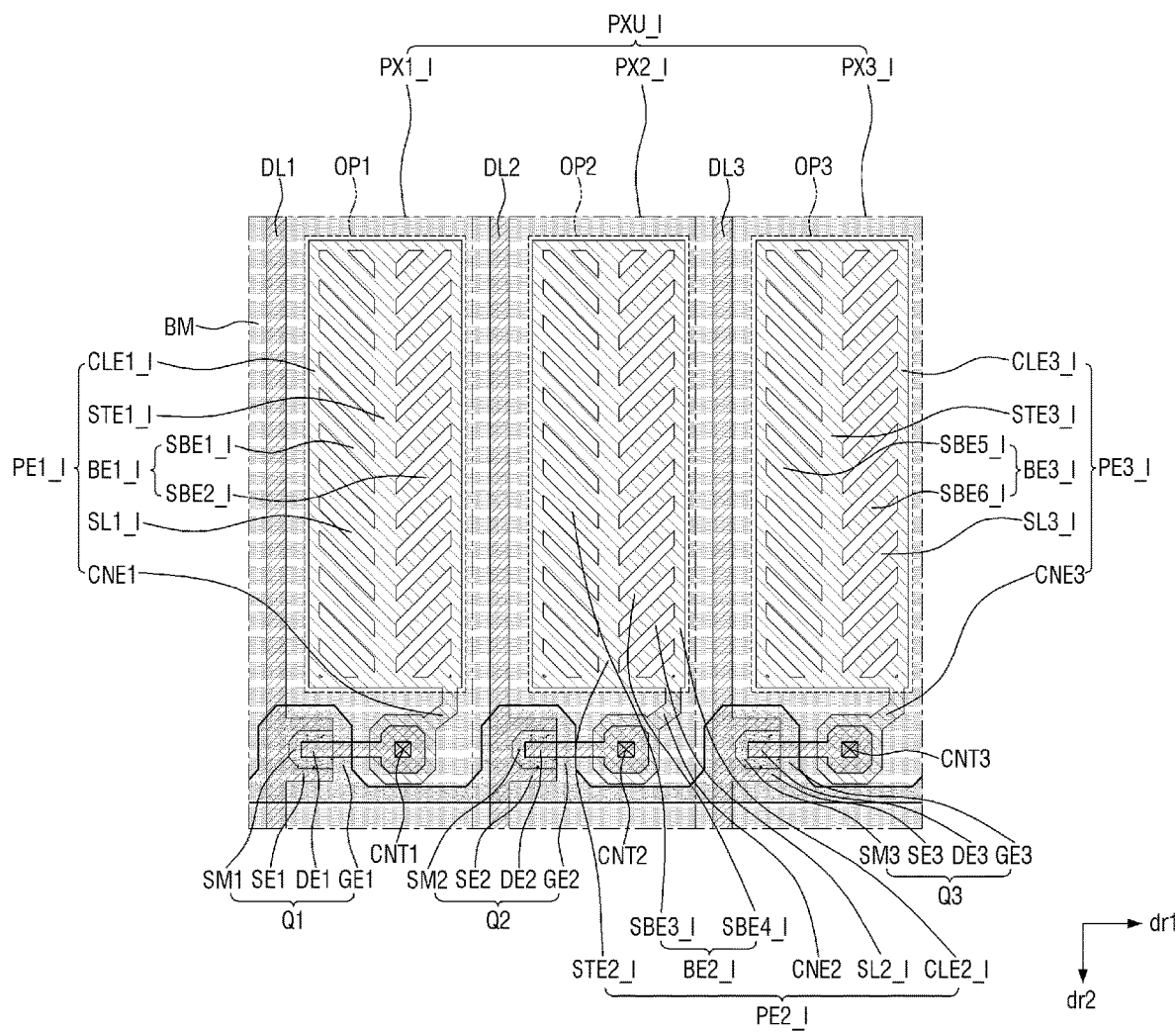
FIG. 17 is a layout diagram showing a pixel unit according to another exemplary embodiment.

FIG. 17 is a layout diagram showing a pixel unit according to another exemplary embodiment.

The elements already described above with respect to FIG. 15 will not be described again.

Referring to FIG. 17, the pixel unit PXU_1 according to the exemplary embodiment of the present disclosure may include first to third pixels PX1_1 to PX3_1.

The first pixel electrode PE1_1 includes a first stem electrode STE1_1, first branch electrodes BE1_1, a first connecting electrode CNE1, and a first closing electrode CLE1_1. The first branch electrodes BE1_1 may include first sub-branch electrodes SBE1_1 and second sub-branch electrodes SBE2_1.

The second pixel electrode PE2_1 may include a second stem electrode STE2_1, second branch electrodes BE2_1, a second connecting electrode CNE2, and a second closing electrode CLE2_1. The second branch electrodes BE2_1 may include third sub-branch electrodes SBE3_1 and fourth sub-branch electrodes SBE4_1.

The third pixel electrode PE3_1 may include a third stem electrode STE3_1, third branch electrodes BE3_1, a third connecting electrode CNE3, and a third closing electrode CLE3_1. The third branch electrodes BE3_1 may include fifth sub-branch electrodes SBE5_1 and sixth sub-branch electrodes SBE6_1.

Hereinafter, description will be made focusing on the first pixel electrode PE1_1.

The first closing electrode CLE1_1 may connect the ends of the first branch electrodes BE1_1 with one another. Specifically, the first closing electrode CLE1_1 may connect the ends of the first sub-branch electrodes SBE1_1 with one another and may connect the ends of the second sub-branch electrodes SBE2_1 with one another. In addition, the first closing electrode CLE1_1 may connect the ends of the first stem electrode STE1_1 with the ends of the first branch electrodes BE1_1 adjacent thereto. As a result, the control over the liquid-crystal molecules LC by the first pixel electrode PE1_1 may be improved at the ends of the first branch electrodes BE1_1, and the transmittance may be improved.

Figure 18:
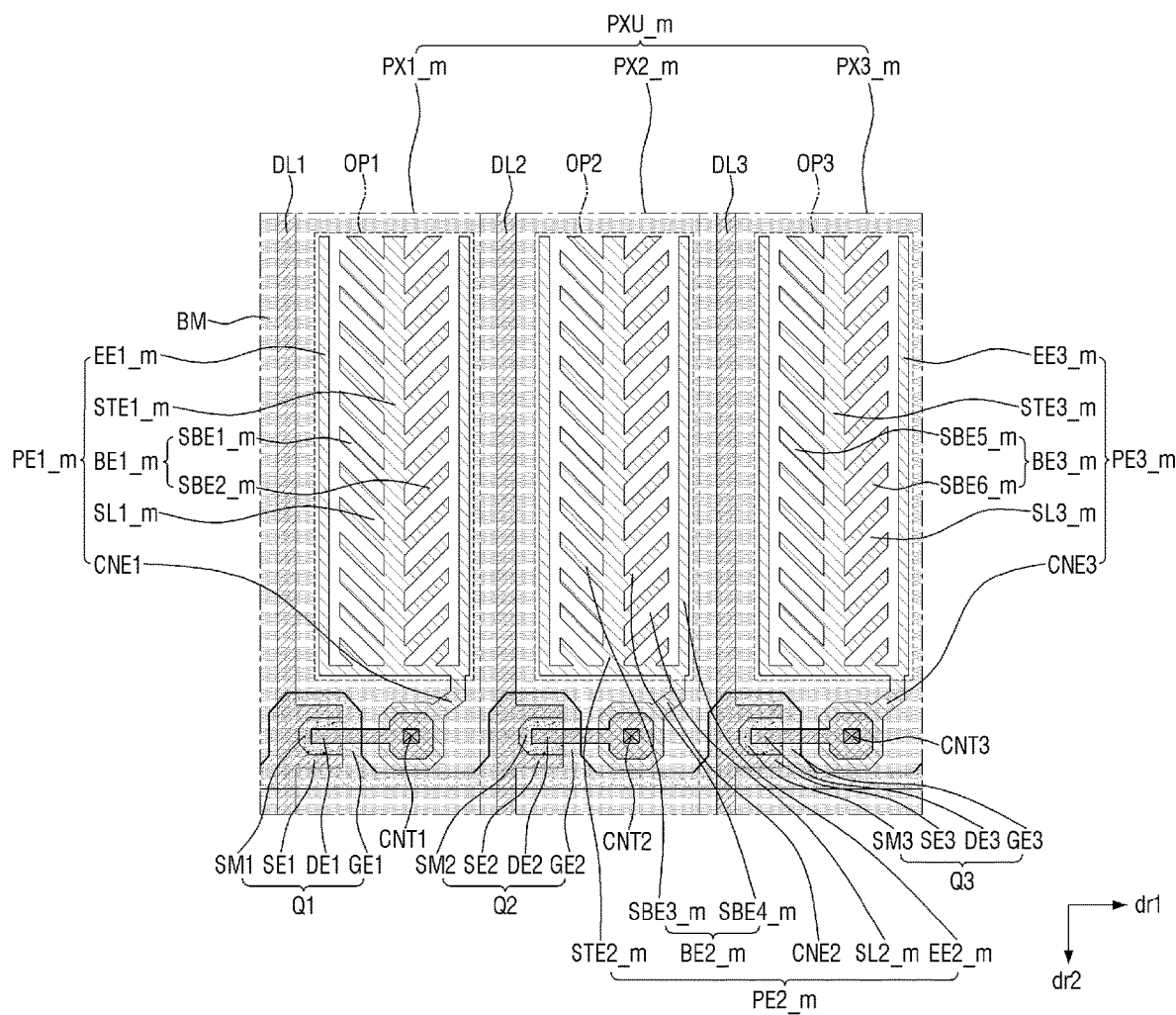
FIG. 18 is a layout diagram showing a pixel unit according to another exemplary embodiment.

FIG. 18 is a layout diagram showing a pixel unit according to another exemplary embodiment.

The elements already described above with respect to FIG. 15 will not be described again.

Referring to FIG. 18, the pixel unit PXU_m according to an exemplary embodiment may include first to third pixel electrodes PE1_*m* to PE3_*m*.

The first pixel electrode PE1_*m* may include the first stem electrode STE1_*m*, the first branch electrodes BE1_*m*, the first connecting electrode CNE1 and a first edge electrode EE1_*m*. The first branch electrodes BE1_*m* may include first sub-branch electrodes SBE1_*m* and second sub-branch electrodes SBE2_*m*.

The second pixel electrode PE2_*m* may include the second stem electrode STE2_*m*, the second branch electrodes BE2_*m*, the second connecting electrode CNE2, and a second edge electrode EE2_*m*. The second branch electrodes BE2_*m* may include third sub-branch electrodes SBE3_*m* and fourth sub-branch electrodes SBE4_*m*.

The third pixel electrode PE3_*m* may include the third stem electrode STE3_*m*, the third branch electrodes BE3_*m*, the third connecting electrode CNE3, and a third edge electrode EE3_*m*. The third branch electrodes BE3_*m* may include fifth sub-branch electrodes SBE5_*m* and sixth sub-branch electrodes SBE6_*m*.

Hereinafter, description will be made focusing on the first pixel electrode PE1_*m*.

The first edge electrode EE1_*m* may extend from the ends of the first stem electrode STE1_*m*, more specifically, from the end of the portion of the first stem electrode STE1_*m* extending in the first direction dr1, and may extend along at least one of the sides of the first opening OP1 where the first stem electrode STE1_*m* is not disposed. According to an exemplary embodiment, there are two ends of the portion extending in the first direction dr1 of the first stem electrode STE1_*m*, and thus there may be two first edge electrodes EE1_*m*. Accordingly, the side of the first opening OP1 may be adjacent to one side of each of the first edge electrodes EE1_*m*, and the ends of the first branch electrodes BE1_*i* may be adjacent to the opposite side of each of the first edge electrode EE1_*m*. As a result, the control over the liquid-crystal molecules LC by the first pixel electrode PE1_*m* may be improved at the ends of the first branch electrodes BE1_*m*, and the transmittance may be improved.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid-crystal display (LCD) device, comprising:
   a first substrate comprising a plurality of pixels;
   a pixel electrode disposed on the first substrate in each of the plurality of pixels;
   a second substrate comprising a surface facing the first substrate;
   a wavelength conversion layer and a transmissive layer disposed on the surface of the second substrate facing the first substrate;
   a liquid-crystal layer disposed between the pixel electrode and the wavelength conversion layer and between the pixel electrode and the transmissive layer; and
   a common electrode disposed between the liquid-crystal layer and the second substrate,
   wherein each pixel electrode comprises a stem electrode and a plurality of branch electrodes extending from the stem electrode;
   wherein all of the plurality of branch electrodes extending from each of the stem electrodes extend in a same direction,
   wherein the pixel electrode has a one-domain structure,
   wherein the stem electrode comprises a first portion extending in a first direction and a second portion extending in a second direction perpendicular to the first direction, and
   wherein the plurality of branch electrodes extend in a direction different from the first direction and the second direction.

2. The LCD device of claim 1, wherein the stem electrode and the plurality of branch electrodes are asymmetric with respect to both of the first direction and the second direction.

3. The LCD device of claim 1, further comprising:
   a gate line and a data line disposed between the first substrate and the pixel electrode,
   wherein the gate line extends in the first direction and the data line extends in the second direction.

4. The LCD device of claim 1, further comprising:
   a closing electrode connecting ends of the plurality of branch electrodes with one another.

5. The LCD device of claim 1, further comprising:
   an edge electrode extending from an end of the stem electrode and disposed adjacent to ends of some of the plurality of branch electrodes.

6. The LCD device of claim 1, wherein the wavelength conversion layer comprises wavelength-converting material and the transmissive layer comprises light-scattering material.

7. The LCD device of claim 6, wherein the wavelength-converting material comprises quantum dots.

8. A liquid-crystal display (LCD) device, comprising:
   a first substrate comprising a plurality of pixels;
   a pixel electrode disposed on the first substrate in each of the plurality of pixels;
   a second substrate comprising a surface facing the first substrate;
   a wavelength conversion layer and a transmissive layer disposed on the surface of the second substrate facing the first substrate; and
   a liquid-crystal layer disposed between the pixel electrode and the wavelength conversion layer and between the pixel electrode and the transmissive layer,
   wherein each pixel electrode is identical and comprises a stem electrode, a plurality of branch electrodes extending from the stem electrode, and an edge electrode extending from an end of the stem electrode and disposed adjacent to ends of some of the plurality of branch electrodes,
   wherein the edge electrode faces the ends of some of the plurality of branch electrodes,
   wherein the edge electrode is spaced from the ends of some of the plurality of branch electrodes, and
   wherein some of the plurality of branch electrodes extending from each of the stem electrodes extend in a same direction.

9. The LCD device of claim 8, wherein the stem electrode comprises a first portion extending in a first direction and a second portion extending in a second direction perpendicular to the first direction.

10. The LCD device of claim 9, wherein the plurality of branch electrodes comprise a plurality of first sub-branch electrodes extending in a third direction different from the first direction and the second direction, and a plurality of second sub-branch electrodes extending in a fourth direction different from the first direction, the second direction and the third direction.

11. The LCD device of claim 10, wherein the stem electrode and the plurality of branch electrodes are asymmetric with respect to either the first direction or the second direction.

12. The LCD device of claim 10, wherein the pixel electrode has a two-domain structure.

13. The LCD device of claim 9, further comprising:
   a gate line and a data line disposed between the first substrate and the pixel electrode,
   wherein the gate line extends in the first direction and the data line extends in the second direction.

* * * * *